United States Patent
Yin et al.

(10) Patent No.: US 12,557,107 B2
(45) Date of Patent: Feb. 17, 2026

(54) UNUSED TRANSMISSION PUSCH OCCASION UPLINK CONTROL INFORMATION (UTO-UCI) FOR CG WITH MULTIPLE PUSCH OCCASIONS

(71) Applicant: Sharp Kabushiki Kaisha, Sakai (JP)

(72) Inventors: Zhanping Yin, Vancouver, WA (US); Tomoki Yoshimura, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 312 days.

(21) Appl. No.: 18/196,957

(22) Filed: May 12, 2023

(65) Prior Publication Data
US 2024/0381358 A1   Nov. 14, 2024

(51) Int. Cl.
*H04W 72/21* (2023.01)
*H04L 5/00* (2006.01)

(52) U.S. Cl.
CPC ........... *H04W 72/21* (2023.01); *H04L 5/0078* (2013.01)

(58) Field of Classification Search
CPC ............................. H04W 72/21; H04L 5/0078
USPC ........................................................ 370/329
See application file for complete search history.

(56) References Cited

U.S. PATENT DOCUMENTS

2024/0276497 A1* 8/2024 Xu ....................... H04W 72/115

OTHER PUBLICATIONS

MCC Support, "Draft Report of 3GPP TSG RAN WG1 #112bis-e v0.1.0 (Online, Apr. 17-26, 2023)", 3GPP TSG RAN WG1 Meeting #113, R1-230xxxx, May 26, 2023.
Nokia, Qualcomm, "Updated WID on XR Enhancements for NR", 3GPP TSG RAN Meeting #99, RP-230786, Mar. 23, 2023.
Nokia, Nokia Shanghai Bell, "XR-specific capacity enhancements", 3GPP TSG RAN WG1 #112bis-e, R1-2303311, Apr. 26, 2023.
Sharp, "Remaining issues on UTO-UCI content and reporting", 3GPP TSG RAN WG1 #114, R1-2307819, Aug. 25, 2023.
Sharp, "Remaining issues on XR-specific capacity enhancements", 3GPP TSG RAN WG1 #113, R1-2305196, May 26, 2023.

* cited by examiner

*Primary Examiner* — Chi Tang P Cheng
(74) *Attorney, Agent, or Firm* — Austin Rapp

(57) ABSTRACT

A user equipment (UE) is described. The UE includes receiving circuitry configured to receive a configuration for a configured grant (CG) with multiple physical uplink shared channel (PUSCH) transmission occasions in a CG period, and a configuration for the unused transmission PUSCH occasion uplink control information (UTO-UCI). The UE also includes transmitting circuitry configured to transmit the UTO-UCI on a CG PUSCH, wherein the UTO-UCI provides a bitmap comprising a bit corresponding to a transmission occasion (TO) within a time duration.

3 Claims, 13 Drawing Sheets

UNUSED TRANSMISSION PUSCH OCCASION UPLINK CONTROL INFORMATION (UTO-UCI) FOR CG WITH MULTIPLE PUSCH OCCASIONS

TECHNICAL FIELD

The present disclosure relates generally to communication systems. More specifically, the present disclosure relates to unused transmission PUSCH occasion uplink control information (UTO-UCI) for CG with multiple PUSCH occasions.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
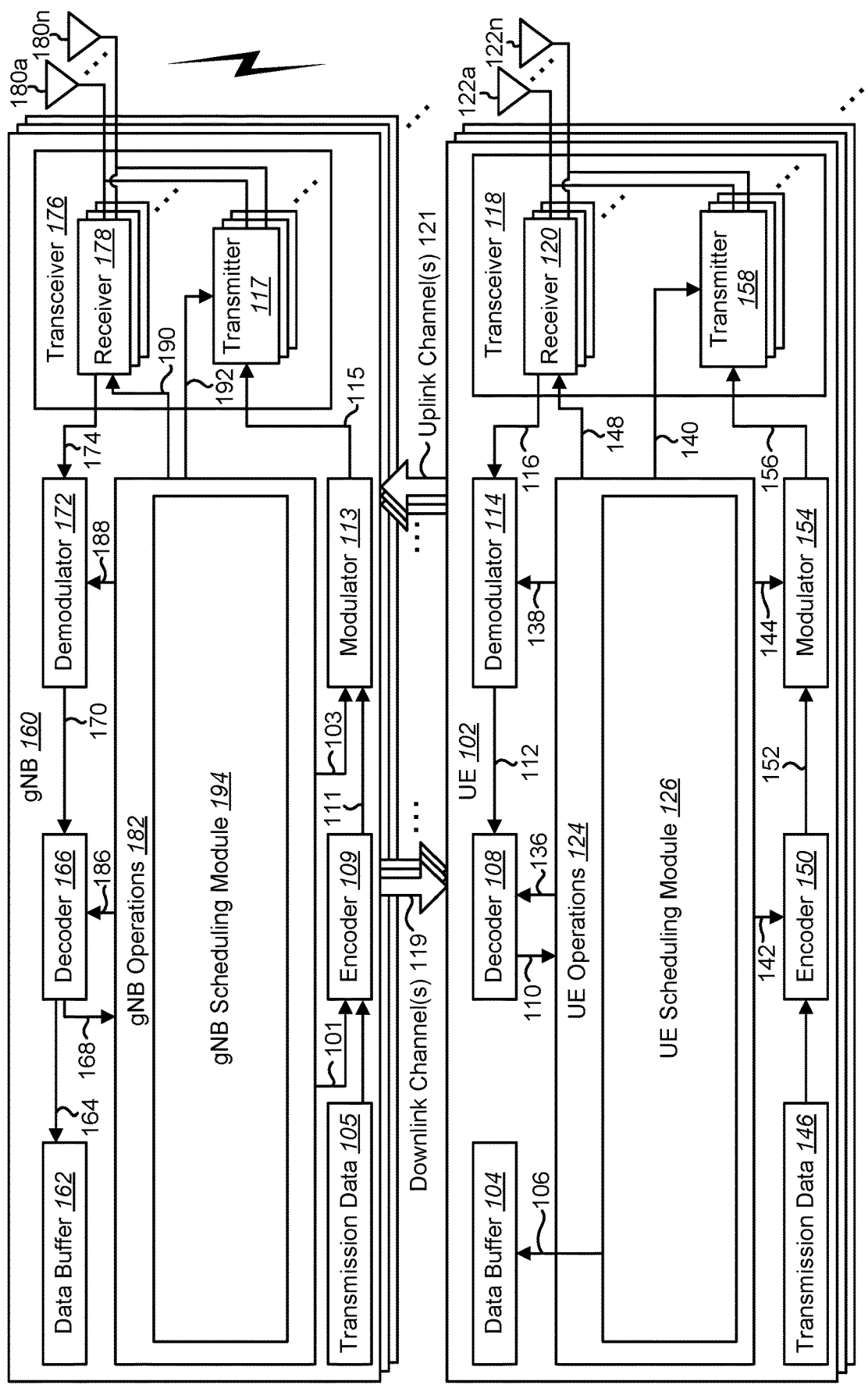
FIG. 1 is a block diagram illustrating one implementation of one or more gNBs and one or more UEs in which systems and methods for joint coding and/or multiplexing of deferred SPS HARQ-ACK may be implemented.

A user equipment (UE) is described. The UE includes receiving circuitry configured to receive a configuration for a configured grant (CG) with multiple physical uplink shared channel (PUSCH) transmission occasions in a CG period, and a configuration for the unused transmission PUSCH occasion uplink control information (UTO-UCI). The UE also includes transmitting circuitry configured to transmit the UTO-UCI on a CG PUSCH, wherein the UTO-UCI provides a bitmap comprising a bit corresponding to a transmission occasion (TO) within a time duration.

In some examples, the bit in the UTO-UCI indicates whether the CG PUSCH TO is unused, with a bit of "1" indicates that a corresponding CG PUSCH TO is "unused", and a bit of "0" indicates that the corresponding CG PUSCH TO is "not unused".

In other examples, the bitmap comprises a plurality of bits that are determined by a starting position and a duration, and wherein each bit corresponds to a CG PUSCH TO in a defined region. The starting position may be after the current CG PUSCH transmission with a processing delay or the next CG PUSCH TO. In some examples, the duration is the same as a periodicity or is defined as a time range or a number of PUSCH TOs.

In some implementations, the plurality of bits further comprise an additional range parameter within the duration to determine validity and override behavior of an "unused" indication.

A base station (gNB) is described. The gNB includes transmitting circuitry configured to configure a configured grant (CG) with multiple physical uplink shared channel (PUSCH) transmission occasions in a period, and the configuration for the unused transmission PUSCH occasion uplink control information (UTO-UCI). The gNB also includes receiving circuitry configured to receive the UTO-UCI on a CG PUSCH, wherein the UTO-UCI provides a bitmap comprising a bit corresponding to a transmission occasion (TO) within a time duration.

A method by a user equipment (UE) is described. The method includes receiving a configuration for a configured grant (CG) with multiple physical uplink shared channel (PUSCH) transmission occasions in a CG period, and a configuration for the unused transmission PUSCH occasion uplink control information (UTO-UCI). The method also includes transmitting the UTO-UCI on a CG PUSCH, wherein the UTO-UCI provides a bitmap comprising a bit corresponding to a transmission occasion (TO) within a time duration.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and/or other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In 5G NR, different services may be supported with different QoS requirements (e.g., reliability and/or delay tolerance). For example, eMBB is targeted for high data rate, and URLLC is targeted for ultra-reliability and low latency. To support ultra-low latency, more than one HARQ-ACK feedback in a slot may be configured for URLLC services. In some approaches, two or more HARQ-ACK codebooks may be simultaneously constructed for different service types. The PUCCH for URLLC HARQ-ACK may be used to transmit HARQ-ACK in a sub-slot level. Furthermore, the PUCCH for URLLC HARQ-ACK may be enhanced with ultra-reliability (e.g., with BLER of $10^{-6}$ instead of $a0^{-2}$. Some of the techniques described herein may include some aspects of SPS HARQ-ACK deferral, available PUCCH resource determination, and/or priority determination for deferred SPS HARQ-ACK, etc.

From a UCI multiplexing point of view, the HARQ-ACK is one UCI type (e.g., it may or may not be necessary to differentiate between SPS HARQ-ACK and non-SPS HARQ-ACK in some approaches). Some of the examples described herein may include up to 2 bits of HARQ-ACK reporting using bundling, etc. In some examples, UCI multiplexing may be utilized for more than 2 bits of total payload. Some examples of the techniques described herein may be utilized for PUCCH format 2/3/4 cases. In some approaches, joint coding and/or separate coding may be supported.

Some examples of the techniques described herein may support cases such as deferred SPS HARQ-ACK and non-deferred HARQ-ACK with the same priority. Some examples of the techniques described herein may include similar behaviors for UCI multiplexing. For example, multiplexing of different UCI of the same priority may be enabled for low priority (LP) HARQ-ACK, LP SR, and CSI, and for high priority (HP) HARQ-ACK with HP SR. Other cases for UCI multiplexing may include HP HARQ-ACK with LP HARQ-ACK, HP HARQ-ACK with HP SR and with LP HARQ-ACK, and HP SR with LP HARQ-ACK.

Deferred and non-deferred HARQ-ACKs with the same priority in the same slot/sub-slot is an issue. In some examples of the techniques described herein, for codebook generation, the SPS and normal HARQ-ACK may be multiplexed in the same HARQ-ACK codebook if their timings point to the same slot/sub-slot. In some examples, deferred SPS HARQ-ACK may have a different timing indication, may be postponed, and/or may be addressed with a separate codebook (e.g., basically a separate codebook). In some examples, two codebooks with the same priority may be maintained at the same time. In some examples, multiplexing may be considered as maintaining one codebook (e.g., only one codebook).

In NR release-17, HARQ-ACK multiplexing with different priorities on PUCCH may be supported. Both joint coding and separate coding methods may be taken into account. Some examples of joint coding methods for multiplexing of HARQ-ACK with different priorities are discussed. For example, when the payload size is small, joint coding may be performed.

In a first aspect, methods are described for HARQ-ACK multiplexing when the number of HARQ-ACK is no more than 2 bits for both high priority HARQ-ACK and low priority HARQ-ACK. In this case, it may be desirable to keep sequence based PUCCH format 0 or PUCCH format 1 for its reliability and resource efficiency.

In a second aspect, joint coding methods are described when the high priority HARQ-ACK and low priority HARQ-ACK are concatenated into a single joint HARQ-ACK coding book for PUCCH transmission.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for joint coding and/or multiplexing of deferred SPS HARQ-ACK may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform joint coding and/or multiplexing of deferred SPS HARQ-ACK as described herein. For instance, the UE 102, the UE operations module 124, and/or the UE scheduling module 126 may perform one or more of the methods (e.g., method 1200 described in relation to FIG. 12, etc.), operations, functions, approaches, and/or examples described herein.

Details of joint coding and/or multiplexing of deferred SPS HARQ-ACK are discussed herein. In some examples, support of multiplexing of HARQ-ACK with different priorities is described. In some examples, a PUSCH or a PUCCH, including repetitions if any, can be of priority index 0 or of priority index 1. In some examples, if a priority index is not provided for a PUSCH or a PUCCH, the priority index is 0.

A high priority UCI may be a high priority HARQ-ACK or a high priority SR. The priority of a SR can be indicated in a SR configuration by higher layer signaling. A high priority HARQ-ACK corresponds to a high priority PDSCH transmission. The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, HARQ-ACK, or PUCCH resource may be configured to support URLLC services. The high priority may be configured with a priority index 1.

A low priority UCI may be a low priority HARQ-ACK or a low priority SR, or a CSI report, etc. A low priority HARQ-ACK corresponds to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, HARQ-ACK, or PUCCH resource may be configured to support eMBB services. The low priority may be configured with a priority index 0.

In some approaches, UCI multiplexing on PUCCH may be supported only for UCIs with the same priority. As enhancements of HARQ-ACK reporting with different priorities, multiplexing of UCI between different priorities can be supported by high layer signaling under some timing restrictions. For example, multiplexing of the same UCI type on a single PUCCH may be supported (e.g., URLLC HARQ-ACK and eMBB HARQ-ACK). In an example, if the low priority PUCCH carrying low priority HARQ-ACK can be fully dropped by the high priority PUCCH carrying high priority HARQ-ACK, multiplexing of HARQ-ACK with different priorities on a single PUCCH may be supported. Otherwise, the low priority PUCCH carrying low priority HARQ-ACK may be dropped and the high priority PUCCH carrying high priority HARQ-ACK is transmitted. Some of the techniques described herein may help to prevent and/or avoid dropping SPS HARQ-ACK for TDD operation.

In some examples, joint coding for multiplexing of HARQ-ACK with different priorities is described herein. If multiplexing of HARQ-ACK with different priorities on a PUCCH is supported, joint coding may be supported. With some examples of joint coding, the HARQ-ACK bits of different priorities may be concatenated into a single codebook, and the joint codebook is encoded and rate matched based on the maximum coding rate of the URLLC PUCCH configuration, and then transmitted on a selected URLLC PUCCH resource.

The PUCCH resource for HARQ-ACK multiplexing of different priorities may be a PUCCH resource configured for the high priority HARQ-ACK codebook (e.g., HARQ-ACK codebook with priority index 1). A UE may be configured by maxCodeRate a code rate multiplexing HARQ-ACK of different priorities in a PUCCH transmission using PUCCH format 2, PUCCH format 3, or PUCCH format 4 configured for high priority HARQ-ACK codebook.

In some examples, joint coding may apply only one channel coding process and may be simpler to implement. This may be a priority inheritance mechanism. When low priority UCI is multiplexed with high priority UCI, the channel coding and error protection for the low priority UCI may be promoted, evaluated and/or inherited from the high priority UCI. For UCI multiplexing between different priorities, the low priority UCI may be provided with the same reliability and error protection as the high priority UCI. On the other hand, the PUCCH resource utilization may be low because all bits are coded together, and the coded bits are rate matched with ultra-reliability requirements following the maximum coding rate configured for the high priority PUCCH.

Joint coding may provide some benefits. For example, joint coding may provide validation by CRC for a codebook with up to 11 bits when the total payload is greater than 11 bits. Joint coding may reduce overhead with one CRC instead of two CRCs. Joint coding may provide higher coding gain (e.g., larger payload by polar code vs. smaller payload by RM code).

For a HARQ-ACK reporting, the PUCCH may be selected based on a maximum payload size configured for a set of PUCCH resources in some examples. A UE may be configured with up to 4 sets of PUCCH resources with different maximum payload sizes. Within each set, the maximum coding rate may satisfy the maximum payload configured for the given set of PUCCH resources. Also, the actual PUCCH transmission may not need to use all configured number of Physical Resource Blocks (PRBs). The PUCCH transmission may use the minimum number of PRBs that can satisfy the maximum code rate for the reported UCI payload.

With joint coding of HARQ-ACK with different priorities, the selected PUCCH format and resource may be determined based on the total payload size of high priority HARQ-ACK and low priority HARQ-ACK. The detailed HARQ-ACK multiplexing method may be specified based on different payload ranges. For example, a HARQ-ACK multiplexing method may be specified when both high priority HARQ-ACK and low priority HARQ-ACK are less than or equal to 2 bits.

Examples of multiplexing of HARQ-ACK with different priorities on PUCCH for up to 2 bits HARQ-ACK codebooks are now described. For up to 2 bits of UCI reporting on PUCCH, a sequence based PUCCH format 0 or PUCCH format 1 may be used. Compared with other PUCCH formats with larger payload size, sequence based PUCCH format 0/1 may be more reliable with less resource utilization. Therefore, it is desirable to use PUCCH format 0 or PUCCH format 1 when possible, especially when the HARQ-ACK bits of each priority index is no more than 2 bits.

In NR, the number of codewords per PDSCH assignment per UE may be limited to one codeword for 1 to 4-layer transmission, and 2 codewords for 5 to 8-layer transmission. In the case of one codeword in a PDSCH, one TB level HARQ-ACK bit may be generated corresponding to the PDSCH. In the case of 2 codewords in a PDSCH, 2 TB level HARQ-ACK bits may be generated for the PDSCH. Therefore, for eMBB service, a PDSCH with 2 codeword may be more likely. For URLLC, due to ultra-reliability requirements, one codeword may be more practical.

Several methods can be utilized for reporting of up to 2 bits of HARQ-ACK for both high priority and low priority.

In a first method (Method 1), PUCCH format 0 and 1 may always be used on the high priority HARQ-ACK PUCCH resource. In this method, PUCCH format 0/1 may always be used for HARQ-ACK multiplexing with different priorities if both high priority HARQ-ACK and low priority HARQ-ACK are up to 2 bits. The original high priority HARQ-ACK PUCCH resource may be used for the joint HARQ-ACK reporting.

In a first approach (Approach 1) of Method 1, HARQ-ACK multiplexing with bundling may be applied within the same priority. In this approach, HARQ-ACK bundling may be applied in case of 2 bits of HARQ-ACK in a codebook so that the total number of HARQ-ACK bits is kept as 2 bits.

For multiplexing of 1 bit of high priority HARQ-ACK and 1 bit of low priority HARQ-ACK, the low priority HARQ-ACK can be appended to the high priority HARQ-ACK. The joint HARQ-ACK may have 2 bits and may be reported on a high priority PUCCH resource with PUCCH format 0 or PUCCH format 1.

For multiplexing of 1 bit of high priority HARQ-ACK and 2 bits of low priority HARQ-ACK, the 2 bits of low priority HARQ-ACK can be bundled into 1 bit first by an AND function. Thus, the bits 00, 01, and 10 may be bundled as 0, and bits 11 may be bundled as 1. The bundled low priority HARQ-ACK bit may then be appended to the high priority HARQ-ACK. The joint HARQ-ACK may have 2 bits and may be reported on a high priority PUCCH resource with PUCCH format 0 or format 1.

For multiplexing of 2 bits of high priority HARQ-ACK and 1 bit of low priority HARQ-ACK, the 2 bits of high priority HARQ-ACK can be bundled into 1 bit first by an AND function. The low priority HARQ-ACK bit may then be appended to the bundled high priority HARQ-ACK. The joint HARQ-ACK may have 2 bits and may be reported on a high priority PUCCH resource with PUCCH format 0 or format 1.

For multiplexing of 2 bits of high priority HARQ-ACK and 2 bits of low priority HARQ-ACK, the 2 bits of high priority HARQ-ACK can be bundled into 1 bit by an AND function. And the 2 bits of low priority HARQ-ACK may be bundled into 1 bit by an AND function. The bundled low priority HARQ-ACK bit may then be appended to the bundled high priority HARQ-ACK. The joint HARQ-ACK may have 2 bits and may be reported on a high priority PUCCH resource with PUCCH format 0 or format 1.

The joint HARQ-ACK may be reported on a high priority PUCCH resource, so the HARQ-ACK report reliability is not an issue. The issue with HARQ-ACK bundling may be a loss of information.

For low priority HARQ-ACK for eMBB PDSCH transmissions, the initial transmission NACK probability may be around 10%. In the case of two TBs in a PDSCH, HARQ-ACK bits of "01", "10" and "00" may all be reported as NACK. Thus, the NACK probability after bundling becomes approximately 20%, which may cause more unnecessary TB retransmissions. However, compared with URLLC PDSCH, eMBB PDSCH is more spectrum efficient with higher FER target and HARQ with soft combining of re-transmissions.

For high priority HARQ-ACK for URLLC PDSCH transmissions, the initial transmission NACK probability may be targeted at $10^{-5}$ or $10^{-6}$, which may be much lower than that of an eMBB PDSCH. Thus, the PDSCH for URLLC may use conservative MCS and much lower coding rate to achieve this target. In the case of two TBs in a high priority PDSCH, HARQ-ACK bits of "01", "10" and "00" may all be reported as NACK. Thus, the NACK probability after bundling becomes 2 times of the target rate at $10^{-5}$ or $10^{-6}$, which is still very low. Thus, the impact of HARQ-ACK bundling of the high priority HARQ-ACK is much smaller than the impact of bundling of low priority HARQ-ACK. Furthermore, since 2 codewords may be supported only for 5-8 layers of MIMO transmissions, due to ultra-reliability requirements, one codeword is more likely for URLLC PDSCH transmissions.

In a second approach (Approach 2) of Method 1, HARQ-ACK multiplexing with bundling may be applied across different priorities (referred to herein as cross priority HARQ-ACK bundling). The above Approach 1 limits HARQ-ACK bundling within the same priority. Alternatively, HARQ-ACK bundling may be performed between HARQ-ACK bits of high priority and low priority. For example, considering the URLLC NACK probability is ultra-low, the ACK reported in the majority of cases may be 99.9999%. A bundle between a high priority HARQ-ACK bit and a low priority HARQ-ACK bit may result in the same value as the low priority HARQ-ACK bit. With this assumption, the alternative approaches can be utilized as follows.

For multiplexing of 1 bit of high priority HARQ-ACK and 1 bit of low priority HARQ-ACK, the low priority HARQ-ACK can be appended to the high priority HARQ-ACK to generate a joint 2 bits HARQ-ACK.

For multiplexing of 1 bit of high priority HARQ-ACK and 2 bits of low priority HARQ-ACK, the 1 bit high priority HARQ-ACK may be bundled into the first bit of low priority HARQ-ACK. The second bit of low priority HARQ-ACK may then be appended. Alternatively, the 1 bit high priority HARQ-ACK may be bundled into the second bit of low priority HARQ-ACK. The bundled bit may then be appended to the first bit of low priority HARQ-ACK.

For multiplexing of 2 bits of high priority HARQ-ACK and 1 bit of low priority HARQ-ACK, the 1 bit low priority HARQ-ACK may be bundled into the first bit of high priority HARQ-ACK. The second bit of high priority HARQ-ACK may then be appended. Alternatively, the 1 bit low priority HARQ-ACK may be bundled into the second bit of low priority HARQ-ACK. The bundled bit may then be appended to the first bit of high priority HARQ-ACK.

For multiplexing of 2 bits of high priority HARQ-ACK and 2 bits of low priority HARQ-ACK, the first bit of high priority HARQ-ACK and the first bit of low priority HARQ-ACK may be bundled into a bundled first bit. The second bit of high priority HARQ-ACK and the second bit of low priority HARQ-ACK may be bundled into a second bundled bit. The first bundle bit and the second bundled bit may be concatenated into 2 bits.

In all cases, the resulting 2 bits of HARQ-ACK may be reported on the high priority HARQ-ACK PUCCH resource with PUCCH format 0 or PUCCH format 1. With cross priority HARQ-ACK bundling, the drawback is that a NACK from a low priority HARQ-ACK bit may cause a NACK report for the high priority HARQ-ACK bit.

In a third approach (Approach 3) of Method 1, HARQ-ACK bundling is allowed between different priorities with high priority NACK overwriting. In this approach, HARQ-ACK bundling may be applied between high priority and low priority HARQ-ACK bits if there are 2 bits of HARQ-ACK in a codebook. But the total number of HARQ-ACK bits after bundling may be kept as 2 bits.

In some cases, bundling between HARQ-ACK with different priorities may not be helpful due to very different target error rate for PDSCH transmissions. If a high priority HARQ-ACK and a low priority HARQ-ACK are bundled together, the bundled bit may have roughly 10% NACK probability. Although ACK to NACK error does not lose data, it may still be too high for URLLC services.

However, since URLLC NACK probability is ultra-low, ACK reported in the majority of cases may be 99.9999%. Therefore, in case of 2 bits of low priority HARQ-ACK bits, the low priority HARQ-ACK bits can be reported on the high priority PUCCH resource assuming an ACK is reported for URLLC. In the case that at least a NACK is reported for high priority HARQ-ACK, the UE may report all NACKs (e.g., "00" on the high priority PUCCH resource). Thus, a NACK of the high priority HARQ-ACK may overwrite the low priority HARQ-ACK.

For multiplexing of 1 bit of high priority HARQ-ACK and 1 bit of low priority HARQ-ACK, this may be the same as Approach 1. The low priority HARQ-ACK can be appended to the high priority HARQ-ACK. The joint HARQ-ACK may have 2 bits and may be reported on a high priority PUCCH resource with PUCCH format 0 or PUCCH format 1.

For multiplexing of 2 bits of high priority HARQ-ACK and 1 bit of low priority HARQ-ACK, this may be the same as Approach 1. The 2 bits of high priority HARQ-ACK can be bundled into 1 bit first by an AND function. The low priority HARQ-ACK bit may then be appended to the bundled high priority HARQ-ACK. The joint HARQ-ACK may have 2 bits and may be reported on a high priority PUCCH resource with PUCCH format 0 or format 1.

If the new approach is applied for multiplexing of 2 bits of high priority HARQ-ACK and 1 bit of low priority HARQ-ACK, then if the high priority HARQ-ACK is all ACKs (e.g., "11" for the two HARQ-ACK bits), then 1 bit of low priority HARQ-ACK may be reported on the high priority PUCCH resource.

If the high priority HARQ-ACK has at least a NACK (e.g., "01", "10" or "11" for the two HARQ-ACK bits), then the UE may report all NACKs (e.g., "00") on the high priority PUCCH resource. The 1 bit of low priority HARQ-ACK may be overwritten by the high priority NACK. With this approach, an all-NACK (e.g., "00") report may indicate a NACK for high priority HARQ-ACK or a NACK for the low priority HARQ-ACK even if there are all ACKs for the high priority HARQ-ACK. The high priority ACK to NACK error report probability may be approximately 10% with 1 bit of low priority HARQ-ACK. This may be too high for the high priority HARQ-ACK.

For multiplexing of 1 bit of high priority HARQ-ACK and 2 bits of low priority HARQ-ACK, if the high priority HARQ-ACK is an ACK, the 2 bits of low priority HARQ-ACK may be reported on the high priority PUCCH resource. If the high priority HARQ-ACK is a NACK, then the UE may report all NACKs (e.g., "00") on the high priority PUCCH resource. The 2 bits of low priority HARQ-ACK may be overwritten by the high priority NACK.

For multiplexing of 2 bits of high priority HARQ-ACK and 2 bits of low priority HARQ-ACK, if the high priority HARQ-ACK is all ACKs (e.g., "11") for the two HARQ-ACK bits, the 2 bits of low priority HARQ-ACK are reported on the high priority PUCCH resource. If the high priority HARQ-ACK has at least a NACK (e.g., "01", "10" or "11") for the two HARQ-ACK bits, then the UE should report all NACKs (e.g., "00") on the high priority PUCCH resource. The 2 bits of low priority HARQ-ACK may be overwritten by the high priority NACK.

Thus, an all-NACK (e.g., "00") report may indicate a NACK for high priority HARQ-ACK or all NACKs for the low priority HARQ-ACK even if all ACKs for the high priority HARQ-ACK. The high priority ACK to NACK error report probability may be approximately 1% when 2 bits of eMBB are all NACK each with a 10% NACK probability. The miss-reporting of low priority ACK to NACK error may be almost avoided for 01 and 10 cases, and the probability of low priority "11" to "00" by URLLC NACK may be negligible at the order of 10. This approach may ensure no information loss for the low priority HARQ-ACK with minimized impact on the low priority HARQ-ACK.

In a fourth approach (Approach 4) of Method 1, for PUCCH format 0, HARQ-ACK bundling may be applied for low priority HARQ-ACK, and cyclic shift values may be used to represent low priority HARQ-ACK. The HARQ-ACK bundling reduces the HARQ-ACK granularity. This may not be desirable at least for high priority HARQ-ACK bits. Thus, in another approach, if the PUCCH format 0 may be used to carry the high priority HARQ-ACK bits, bundling of high priority HARQ-ACK bits may not be used. The high priority HARQ-ACK may be reported on the original PUCCH resource, the low priority HARQ-ACK may be represented by applying the same cyclic shift or a different cyclic shift on the sequence and cyclic shift determined by the high priority HARQ-ACK information bits.

With this approach, only 1 bit of low priority HARQ-ACK bit may be reported. In the case of 2 bits of low priority HARQ-ACK, the low priority HARQ-ACK may be bundled to 1 bit by an AND function. Thus, the low priority HARQ-ACK bits of 00, 01, and 10 may be bundled as 0, and bits 11 may be bundled as 1.

If a UE transmits a PUCCH with HARQ-ACK information using PUCCH format 0, the UE may determine values $m_O$ and $m_{CS}$ for computing a value of cyclic shift α where $m_O$ may be provided by initialCyclicShift of PUCCH-format0 or, if initialCyclicShift may not be provided, by the initial cyclic shift index, and $m_{CS}$ may be determined from the value of one HARQ-ACK information bit or from the values of two HARQ-ACK information bits.

In the case of multiplexing of up to 2 bits of HARQ-ACK with priority index 1 and up to 2 bits of HARQ-ACK with priority index 0 on a PUCCH format 0 configured for the HARQ-ACK with priority index 1, the high priority HARQ-ACK bits may be represented by a cyclic shift on the sequence based on the UCI bits, and the low priority HARQ-ACK bits may be represented by applying the same or a different cyclic shift over the high priority HARQ-ACK bits. The additional cyclic shift value may be determined by the low priority HARQ-ACK value.

In some methods, in the case of one bit of low priority HARQ-ACK bit with an ACK or "1", or two bits of low priority HARQ-ACK bit with an all ACKs or "11", the cyclic shift of the high priority HARQ-ACK bits may be kept the same. In the case of one bit of low priority HARQ-ACK bit with a NACK or "0", or two bits of low priority HARQ-ACK bit with at least a NACK, i.e. "01", "10" or "00", a different cyclic shift from the high priority HARQ-ACK bits may be used. Examples of cyclic shifts for different HARQ-ACK bits combinations are given in tables below. Table-1 illustrates an example for mapping of values for one high priority HARQ-ACK information bit and one or two low priority HARQ-ACK information bits to sequences for PUCCH format 0. Table-2 illustrates an example for mapping of values for two high priority HARQ-ACK information bits and one or two low priority HARQ-ACK information bits to sequences for PUCCH format 0.

TABLE 1

| | High priority HARQ-ACK value | | | |
|---|---|---|---|---|
| | 0 | | 1 | |
| | Low priority HARQ-ACK value | | | |
| | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits |
| Sequence cyclic shift | $m_{cs} = 0$ | $m_{cs} = 3$ | $m_{cs} = 6$ | $m_{cs} = 9$ |

TABLE 2

| | High priority HARQ-ACK value | | | | | | | |
|---|---|---|---|---|---|---|---|---|
| | {0, 0} | | {0, 1} | | {1, 1} | | {1, 0} | |
| | Low priority HARQ-ACK value | | | | | | | |
| | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits |
| Sequence cyclic shift | $m_{cs} = 0$ | $m_{cs} = 1$ | $m_{cs} = 3$ | $m_{cs} = 4$ | $m_{cs} = 6$ | $m_{cs} = 7$ | $m_{cs} = 9$ | $m_{cs} = 10$ |

In another implementation, the opposite may apply. Thus, in the case of one bit of low priority HARQ-ACK bit with an NACK or "0", or two bits of low priority HARQ-ACK bit with at least a NACK (e.g., "01", "10" or "00"), the cyclic shift of the high priority HARQ-ACK bits may be kept the same. In the case of one bit of low priority HARQ-ACK bit with an ACK or "1", or two bits of low priority HARQ-ACK bit with an all ACKs or "11", a different cyclic shift from the high priority HARQ-ACK bits may be used. The cyclic shifts for different HARQ-ACK bits combinations are given in the tables below. Table-3 illustrates an example for mapping of values for one high priority HARQ-ACK information bit and one or two low priority HARQ-ACK information bits to sequences for PUCCH format 0. Table-4 illustrates an example for mapping of values for two high priority HARQ-ACK information bits and one or two low priority HARQ-ACK information bit to sequences for PUCCH format 0.

TABLE 3

| | High priority HARQ-ACK | | | |
|---|---|---|---|---|
| | 0 | | 1 | |
| | Low priority HARQ-ACK | | | |
| | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits |
| Sequence cyclic shift | $m_{cs} = 0$ | $m_{cs} = 3$ | $m_{cs} = 6$ | $m_{cs} = 9$ |

TABLE 4

| | High priority HARQ-ACK | | | | | | | |
|---|---|---|---|---|---|---|---|---|
| | {0, 0} | | {0, 1} | | {1, 1} | | {1, 0} | |
| | Low priority HARQ-ACK | | | | | | | |
| | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits | 0 for 1 bit, or {0, 1}, {1, 0} or {0, 0} for 2 bits | 1 for 1 bit, or {1, 1} for 2 bits |
| Sequence cyclic shift | $m_{cs} = 0$ | $m_{cs} = 1$ | $m_{cs} = 3$ | $m_{cs} = 4$ | $m_{cs} = 6$ | $m_{cs} = 7$ | $m_{cs} = 9$ | $m_{cs} = 10$ |

In a second method (Method 2), different high priority PUCCH formats and resources may be used based on total HARQ-ACK payload. In this method, the number of high priority HARQ-ACK bits may not be bundled, and one bit of HARQ-ACK can be multiplexed as it is. The total payload may have different variations based on the combinations of number of bits for the HARQ-ACK codebooks, and different PUCCH resources with different PUCCH formats may be used for the HARQ-ACK multiplexing.

For multiplexing of 1 bit of high priority HARQ-ACK and 1 bit of low priority HARQ-ACK, the low priority HARQ-ACK can be appended to the high priority HARQ-ACK. The joint HARQ-ACK may have 2 bits and may be reported on a high priority PUCCH resource with PUCCH format 0 or PUCCH format 1.

For multiplexing of 1 bit of high priority HARQ-ACK and 2 bits of low priority HARQ-ACK, some approaches can be utilized. In one approach, the 2 bits of low priority HARQ-ACK may be bundled into 1 bit, the bundled low priority HARQ-ACK bit can be appended to the high priority HARQ-ACK. The joint HARQ-ACK may have 2 bits and may be reported on a high priority PUCCH resource with PUCCH format 0 or PUCCH format 1. In another approach, the 2 bits of low priority HARQ-ACK can be appended to the high priority HARQ-ACK. The joint HARQ-ACK has more than 2 bits and may be reported on a high priority PUCCH resource with PUCCH format 2 or PUCCH format 3 or PUCCH format 4.

For multiplexing of 2 bits of high priority HARQ-ACK and 1 bit or 2 bits of low priority HARQ-ACK, the low priority HARQ-ACK can be appended to the high priority HARQ-ACK. The joint HARQ-ACK has more than 2 bits and may be reported on a high priority PUCCH resource with PUCCH format 2 or PUCCH format 3 or PUCCH format 4.

In a third method (Method 3), 2 bits for each HARQ-ACK priority may always be assumed and multiplexed on a high priority HARQ-ACK PUCCH resource with PUCCH format 2/3/4. In this method, the PUCCH resource carrying the multiplexed HARQ-ACK codebooks may be always a high priority HARQ-ACK PUCCH resource used with PUCCH format 2 or PUCCH format 3 or PUCCH format 4 carrying more than 2 bits. Thus, in the case of 1 or 2 bits of HARQ-ACK, the UE may always assume 2 bits when HARQ-ACK multiplexing between different priorities may be performed. In the case of 1 bit of HARQ-ACK in a codebook, the HARQ-ACK information bit may be repeated to generate two bits (e.g., a bit of "0" may be reported with "00", and a bit of "1" may be reported with "11"). This ensures the total payload may be more than 2 bits.

The concatenated HARQ-ACK bits may then be encoded and transmitted on a high priority HARQ-ACK PUCCH resource with PUCCH format 2 or PUCCH format 3 or PUCCH format 4. This provides a unified solution for multiplexing of HARQ-ACK with different priorities regardless of the HARQ-ACK codebook sizes.

In a fourth method (Method 4), joint HARQ-ACK multiplexing and reporting may be performed with PUCCH channel selection. In the methods above, the PUCCH resource for high priority HARQ-ACK may be used to report the multiplexed HARQ-ACK bits with different priorities with bundling as necessary. In another method, since there are PUCCH resources for both high priority and low priority HARQ-ACK, PUCCH channel selection can be used to carry extra information for HARQ-ACK multiplexing.

As discussed above, for high priority HARQ-ACK, the NACK probability even after HARQ-ACK bundling becomes 2 times the target rate at $10^{-5}$ or $10^{-6}$, which may be still very low. Thus, the impact of HARQ-ACK bundling of the high priority HARQ-ACK may be very small. URLLC NACK probability may be ultra-low, and the ACK reported in the majority of cases may be 99.9999%.

To explore the ultra-reliability of URLLC traffic, in this method, in case of all ACKs for the high priority HARQ-ACK, high priority HARQ-ACK PUCCH resource may be used to report 1 or 2 bits of low priority HARQ-ACK, i.e. one or two bits the eMBB HARQ-ACK bits are reported on the URLLC PUCCH resource. If there may be at least a NACK for the high priority HARQ-ACK, the high priority HARQ-ACK PUCCH may not be transmitted. The low priority HARQ-ACK may be reported on the low priority HARQ-ACK PUCCH resource. Since the high priority PUCCH may not be transmitted, the gNB may not detect the high priority PUCCH transmission, and may treat it as a DTX, where a DTX may be equivalent to NACK in HARQ-ACK reporting.

For multiplexing of 1 bit of high priority HARQ-ACK and 1 bit or 2 bits of low priority HARQ-ACK, with an ACK feedback of the high priority HARQ-ACK, the 1 bit or 2 bits of low priority HARQ-ACK may be reported on the high priority PUCCH resource. With a NACK feedback of the high priority HARQ-ACK, the 1 bit or 2 bits of low priority HARQ-ACK may be reported on the low priority PUCCH resource.

For multiplexing of 2 bits of high priority HARQ-ACK and 1 bit or 2 bits of low priority HARQ-ACK, with all ACK feedback of the high priority HARQ-ACK (e.g., "11" for high priority HARQ-ACK), the 1 bit or 2 bits of low priority HARQ-ACK may be reported on the high priority PUCCH resource. With at least a NACK feedback of the high priority HARQ-ACK (e.g., "01", "10" or "00" for high priority HARQ-ACK), the 1 bit or 2 bits of low priority HARQ-ACK may be reported on the low priority PUCCH resource.

With Method 4, almost no HARQ-ACK information may be lost due to HARQ-ACK bundling. The high priority HARQ-ACK may be represented by the PUCCH resource selection. An ACK may be reported for the high priority HARQ-ACK if the low priority HARQ-ACK is reported on the high priority PUCCH resource. A NACK may be reported for the high priority HARQ-ACK if the low priority HARQ-ACK is reported on the low priority PUCCH resource.

In another aspect, joint coding and multiplexing of HARQ-ACK of different priorities on PUCCH format 2/3/4 are described. A joint coding method is described wherein the high priority HARQ-ACK and low priority HARQ-ACK may be concatenated into a single joint HARQ-ACK coding book for PUCCH transmission. This may be a more general case for HARQ-ACK multiplexing on PUCCH with joint coding.

Some examples of conditions for HARQ-ACK multiplexing using PUCCH format 2/3/4 are now described. PUCCH format 2, PUCCH format 3 and PUCCH format 4 may be defined for more than 2 bits of UCI payload. $O_{ACK\_1}$ may be a total number of HARQ-ACK information bits with priority index 1. $O_{ACK\_0}$ may be a total number of HARQ-ACK information bits with priority index 0.

If there are up to 2 bits of for both high priority HARQ-ACK and low priority HARQ in a HARQ-ACK only reporting, and if method 1 or method 4 above are used, PUCCH format 0 or PUCCH format 1 may always be used for the joint HARQ-ACK multiplexing and reporting. Thus, even if the total payload of high priority HARQ-ACK and low priority HARQ-ACK may be more than 2 bits, a joint report method on PUCCH format 2 or PUCCH format 3 or PUCCH format 4 may not be applicable.

Therefore, in one approach, if method 1 and method 4 above are used for up to 2 bits of HARQ-ACK codebooks, multiplexing of HARQ-ACK of different priorities with joint coding on PUCCH format 2 or PUCCH format 3 or PUCCH format 4 may be only applicable if the number of bits of any HARQ-ACK codebook may be greater than 2 (e.g., under the condition of $O_{ACK\_1}>2$ and $O_{ACK\_0}>2$).

On the other hand, in method 3 above and some cases in method 2, multiplexing of HARQ-ACK of different priorities with joint coding on PUCCH format 2, PUCCH format 3, or PUCCH format 4 may be applied if the total HARQ-ACK payload is more than 2 bits. Furthermore, if the number of bits of any HARQ-ACK codebook may be greater than 2, the low priority HARQ-ACK can be appended to the high priority HARQ-ACK. The joint HARQ-ACK may be always greater than 2 bits and may be reported on a high priority PUCCH resource with PUCCH format 2 or PUCCH format 3 or PUCCH format 4.

Thus, in another approach, if method 2 is used for up to 2 bits of HARQ-ACK codebooks, multiplexing of HARQ-ACK of different priorities with joint coding on PUCCH format 2. PUCCH format 3, or PUCCH format 4 may be applied if the total HARQ-ACK payload of different priorities is more than 2 bits (e.g., under the condition of $O_{ACK\_1}+O_{ACK\_0}>2$).

Yet in another approach, if method 3 is used for up to 2 bits of HARQ-ACK codebooks, 2 bits may be always assumed for up to 2 bits of HARQ-ACK, and the total HARQ-ACK payload may be always more than 2 bits. In case of 1 bit of HARQ-ACK in a codebook, the HARQ-ACK information bit may be repeated to generate two bits (e.g., a bit of "0" may be reported with "00", and a bit of "1" may be reported with "11"). Thus, HARQ-ACK multiplexing on PUCCH format 2, PUCCH format 3, or PUCCH format 4 may always be used, and may be defined as a unified solution that may be applicable to all HARQ-ACK payload sizes. In this case, HARQ-ACK multiplexing with different priorities may not be supported if a UE is configured with only one set of PUCCH resources for the high priority HARQ-ACK.

With HARQ-ACK multiplexing of different priorities and joint coding using PUCCH format 2, PUCCH format 3, or PUCCH format 4, a PUCCH resource configured for the high priority HARQ-ACK may be selected to report the joint HARQ-ACK information.

In some methods, if the total payload exceeds the maximum payload size of all configured sets of high priority HARQ-ACK PUCCH resources, the HARQ-ACK codebook with priority 0 may be dropped, and only the HARQ-ACK codebook with priority index 1 may be reported on a high priority HARQ-ACK PUCCH resource based on the payload of the high priority HARQ-ACK.

In some methods, if the total payload exceeds the maximum payload size of all configured sets of high priority HARQ-ACK PUCCH resources, some payload reduction methods can be applied to the HARQ-ACK codebook with priority 0. The payload reduction method may include some HARQ-ACK bundling schemes. Then, the payload reduced HARQ-ACK with priority 0 can be appended to the HARQ-ACK codebook with priority 1 to create a new joint HARQ-ACK codebook.

The UE may perform PUCCH set selection again based on the payload of the new joint HARQ-ACK information. If there is available high priority HARQ-ACK PUCCH resources to carry the new joint HARQ-ACK information, a high priority HARQ-ACK PUCCH resource may be determined based on the payload of the new joint HARQ-ACK codebook.

If the payload of the new joint HARQ-ACK codebook still exceeds the maximum payload size of all configured sets of high priority HARQ-ACK PUCCH resources, the HARQ-ACK codebook with priority 0 may be dropped, and only the HARQ-ACK codebook with priority index 1 may be reported on a high priority HARQ-ACK PUCCH resource based on the payload of the high priority HARQ-ACK.

PUCCH resource selection is also described herein. The PUCCH resource may be selected based on the total UCI payload size, and a single maxCodeRate may be applied for the UCI coding and rate matching on PUCCH using PUCCH format 2, PUCCH format 3, or PUCCH format 4.

For a HARQ-ACK codebook with high priority or a HARQ-ACK codebook with low priority, a UE can be configured up to four sets of PUCCH resources. A set of PUCCH resources may be provided by PUCCH-ResourceSet and may be associated with a set of PUCCH resources index provided by pucch-ResourceSetId, with a set of PUCCH resource indexes provided by resourceList that provides a set of PUCCH-ResourceId used in the Set of PUCCH resources, and with a maximum number of UCI information bits the UE can transmit using a PUCCH resource in the set of PUCCH resources provided by maxPayloadSize. For the first set of PUCCH resources, the maximum number of UCI information bits may be 2. A maximum number of PUCCH resource indexes for a set of PUCCH resources may be provided by maxNrofPUCCH-ResourcesPerSet. The maximum number of PUCCH resources in the first set of PUCCH resources may be 32 and the maximum number of PUCCH resources in the other set of PUCCH resources may be 8.

If the UE transmits $O_{UCI}$ UCI information bits, that include HARQ-ACK information bits, the UE may determine a set of PUCCH resources to be a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously.

Alternatively, the UE may determine a set of PUCCH resources to be a second set of PUCCH resources with pucch-ResourceSetId=1, if provided by higher layers, if $2<O_{UCI} \leq N_2$ where $N_2$ is equal to maxPayloadSize if maxPayloadSize is provided for the set of PUCCH resources with pucch-ResourceSetId=1, otherwise $N_2$ is equal to 1706.

In another alternative, the UE may determine a set of PUCCH resources to be a third set of PUCCH resources with pucch-ResourceSetId=2, if provided by higher layers, if $N_2<O_{UCI} \leq N_3$ where $N_3$ is equal to maxPayloadSize if maxPayloadSize is provided for the Set of PUCCH resources with pucch-ResourceSetId=2; otherwise $N_3$ is equal to 1706, or In another alternative, the UE may determine a set of PUCCH resources to be a fourth set of PUCCH resources with pucch-ResourceSetId=3, if provided by higher layers, if $N_3<O_{UCI} \leq 1706$.

The sets of PUCCH resources for the high priority HARQ-ACK and low priority HARQ-ACK may be configured separately with different PUCCH parameters and PUCCH configurations. In NR release-15 and 16, the HARQ-ACK of a given priority may be reported only on a HARQ-ACK PUCCH resource with the same priority. UCI multiplexing of the same priority can be performed and transmitted on a PUCCH with the same priority (e.g., HARQ-ACK and/or SR and/or CSI with the same priority can be multiplexed and reported on a PUCCH resource with the same priority). HARQ-ACK and SR can be configured with priority index 1 (high priority) or priority index 0 (low priority), but CSI may be always treated as low priority in Rel-16.

To maintain the reliability requirements of high priority HARQ-ACK, in the case that HARQ-ACK multiplexing of different priorities may be supported on PUCCH, a PUCCH resource configured for the high priority HARQ-ACK may be selected to report the multiplexed HARQ-ACK information.

For multiplexing of HARQ-ACK with different priorities with joint coding, and in that case that the total payload is more than 2 bits, for a HARQ-ACK only reporting on a PUCCH using PUCCH format 2, PUCCH format 3, or PUCCH format 4, the payload size may be determined by $O_{ACK} = O_{ACK\_1} + O_{ACK\_0}$, as the number of bits for HARQ-ACK for transmission on the current PUCCH, where $O_{ACK} > 2$, $O_{ACK\_1}$ is a total number of HARQ-ACK information bits with priority index 1, $O_{ACK\_0}$ is a total number of HARQ-ACK information bits with priority index 0.

The HARQ-ACK multiplexing may happen when the PUCCH for low priority HARQ-ACK and the PUCCH for high priority HARQ-ACK overlaps with each other in a slot. For HARQ-ACK only reporting with joint coding, the joint HARQ-ACK codebook may be constructed by appending the HARQ-ACK information bits with priority index 0 to the end of the HARQ-ACK information bits with priority index 1.

The UE may determine a set of PUCCH resources based on the $O_{UCI}$ UCI information bits as described above. For HARQ-ACK with different priorities and joint coding, $O_{UCI}$ may be given by $O_{ACK} = O_{ACK\_1} + O_{ACK\_0}$.

For a PUCCH transmission with HARQ-ACK information, a UE may determine a PUCCH resource after determining a set of PUCCH resources for $O_{UCI}$ HARQ-ACK information bits. The PUCCH resource determination may be based on a PUCCH resource indicator field, if present, in a last DCI format, among the DCI formats that have a value of a PDSCH-to-HARQ_feedback timing indicator field, if present, or a value of dl-DataToUL-ACK, or a value of dl-DataToUL-ACKForDCIFormat1_2 for DCI format 1_2, indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. For indexing DCI formats within a serving cell for a same PDCCH monitoring occasion, if the UE is not provided CORESETPoolIndex or is provided CORESETPoolIndex with value 0 for one or more first CORESETs and is provided CORESETPoolIndex with value 1 for one or more second CORESETs on an active DL BWP of a serving cell, and with ACKNACKFeedbackMode=JointFeedback for the active UL BWP, detected DCI formats from PDCCH receptions in the first CORESETs may be indexed prior to detected DCI formats from PDCCH receptions in the second CORESETs.

The PUCCH resource indicator field values may map to values of a set of PUCCH resource indexes, as defined in Table-5 for a PUCCH resource indicator field of 3 bits, provided by resourceList for PUCCH resources from a set of PUCCH resources provided by PUCCH-ResourceSet with a maximum of eight PUCCH resources. If the PUCCH resource indicator field includes 1 bit or 2 bits, the values map to the first 2 values or the first four values, respectively, of Table-5.

For the first set of PUCCH resources and when the size $R_{PUCCH}$ of resourceList is larger than eight, when a UE provides HARQ-ACK information in a PUCCH transmission in response to detecting a last DCI format in a PDCCH reception, among DCI formats with a value of the PDSCH-to-HARQ_feedback timing indicator field, if present, or a value of dl-DataToUL-ACK, or a value of dl-DataToUL-ACKForDCIFormat1_2 for DCI format 1_2, indicating a same slot for the PUCCH transmission, the UE may determine a PUCCH resource with index $r_{PUCCH}$, $0 \leq r_{PUCCH} \leq R_{PUCCH} - 1$, as $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in CORESET p of the PDCCH reception for the DCI format, $n_{CCE,p}$ is the index of a first CCE for the PDCCH reception, and $\Delta_{PRI}$ is a value of the PUCCH resource indicator field in the DCI format.

Table-5 illustrates examples for mapping of PUCCH resource indication field values to a PUCCH resource in a PUCCH resource set with maximum 8 PUCCH resources.

TABLE 5

| PUCCH resource indicator | | | PUCCH resource |
|---|---|---|---|
| 1 bit | 2 bits | 3 bits | |
| '0' | '00' | '000' | 1$^{st}$ PUCCH resource provided by pucch-ResourceId obtained from the 1$^{st}$ value of resourceList |
| '1' | '01' | '001' | 2$^{nd}$ PUCCH resource provided by pucch-ResourceId obtained from the 2$^{nd}$ value of resourceList |
| | '10' | '010' | 3$^{rd}$ PUCCH resource provided by pucch-ResourceId obtained from the 3$^{rd}$ value of resourceList |
| | '11' | '011' | 4$^{th}$ PUCCH resource provided by pucch-ResourceId obtained from the 4$^{th}$ value of resourceList |
| | | '100' | 5$^{th}$ PUCCH resource provided by pucch-ResourceId obtained from the 5$^{th}$ value of resourceList |
| | | '101' | 6$^{th}$ PUCCH resource provided by pucch-ResourceId obtained from the 6$^{th}$ value of resourceList |
| | | '110' | 7$^{th}$ PUCCH resource provided by pucch-ResourceId obtained from the 7$^{th}$ value of resourceList |
| | | '111' | 8$^{th}$ PUCCH resource provided by pucch-ResourceId obtained from the 8$^{th}$ value of resourceList |

If a UE detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE may not expect to multiplex HARQ-ACK information corresponding to the second DCI format in a PUCCH resource in the slot if the PDCCH reception that includes the second DCI format is not earlier than $N_3 \cdot (2048+144) \cdot \kappa \cdot 2^{-\mu} \cdot T_C$ from the beginning of a first symbol of the first resource for PUCCH transmission in the slot where, $\kappa$ and $T_C$ are defined in clause 4.1 of 3GPP TS 38.211 and $\mu$ corresponds to the smallest SCS configuration among the SCS configurations of the PDCCHs providing the DCI formats and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for $\mu=0$, $N_3=4.5$ for $\mu=1$, $N_3=9$ for $\mu=2$; otherwise, $N_3=8$ for $\mu=0$, $N_3=10$ for $\mu=1$, $N_3=17$ for $\mu=2$, and $N_3=20$ for $\mu=3$.

If a UE may not be provided SPS-PUCCH-AN-List and transmits HARQ-ACK information corresponding only to a PDSCH reception without a corresponding PDCCH, a PUCCH resource for corresponding PUCCH transmission with HARQ-ACK information may be provided by n1PUCCH-AN.

It should be noted that the PUCCH resource determination may be performed independently for HARQ-ACK with a given priority index. For a PUCCH transmission with joint HARQ-ACK information with different priorities, a UE determines a high priority PUCCH resource after determining a set of high priority PUCCH resources for $O_{UCI}$ joint HARQ-ACK information bits. The PUCCH resource determination may be based on the above procedures for the high priority PDSCH transmissions. For example, the PUCCH resource determination may be based on a PUCCH resource indicator field in a last DCI format scheduling a high priority PDSCH transmission, among the DCI formats that have a value of a PDSCH-to-HARQ feedback timing indicator field, indicating a same slot for the PUCCH transmission.

Code rate and PRB determination for HARQ-ACK multiplexing on PUCCH is now described. A UE may be configured by maxCodeRate a code rate for multiplexing HARQ-ACK, SR, and CSI report(s) in a PUCCH transmission using PUCCH format 2, PUCCH format 3, or PUCCH format 4. In some examples, maxCodeRate may be applicable only for different UCI types with the same priorities can be multiplexed on PUCCH using PUCCH format 2, PUCCH format 3, or PUCCH format 4.

Thus, in the PUCCH-Config for priority index 1, a UE may be configured by maxCodeRate a code rate for multiplexing HARQ-ACK, and SR in a PUCCH transmission using PUCCH format 2, PUCCH format 3, or PUCCH format 4. And, in the PUCCH-Config for priority index 0, a UE may be configured by a separate maxCodeRate a code rate for multiplexing HARQ-ACK, SR, and CSI report(s) in a PUCCH transmission using PUCCH format 2, PUCCH format 3, or PUCCH format 4.

As an enhancement for UCI reporting, the same UCI type with different priorities can be supported, especially for HARQ-ACK. For multiplexing of HARQ-ACK with different priorities and joint coding on PUCCH format 2, PUCCH format 3, or PUCCH format 4, the maxCodeRate configured for the high priority PUCCH in the corresponding PUCCH-Config may be applied.

In the case of HARQ-ACK multiplexing with different priorities with joint coding, the maxCodeRate configured for the high priority PUCCH-Config may also be applied to the joint high priority HARQ-ACK and low priority HARQ-ACK bits in a PUCCH transmission using PUCCH format 2, PUCCH format 3, or PUCCH format 4.

In the following, r is a code rate given by maxCodeRate as in Table-5 configured for the selected PUCCH resource. $M_{RB}^{PUCCH}$ a number of PRBs for PUCCH format 2, or PUCCH format 3, or PUCCH format 4, respectively, where $M_{RB}^{PUCCH}$ is provided by nrofPRBs in PUCCH-format2 for PUCCH format 2 or by nrofPRBs in PUCCH-format3 for PUCCH format 3, and $M_{RB}^{PUCCH}=1$ for PUCCH format 4. $N_{sc,ctrl}^{RB}=N_{sc}^{RB}-4$ for PUCCH format 2 or, if the PUCCH resource with PUCCH format 2 includes an orthogonal cover code with length $N_{SF}^{PUCCH,2}$ provided by OCC-Length-r16, $N_{sc,ctrl}^{RB}=(N_{sc}^{RB}-4)/N_{SF}^{PUCCH,2}$, $N_{sc,ctrl}^{RB}=N_{sc}^{RB}$ for PUCCH format 3 or, if the PUCCH resource with PUCCH format 3 includes an orthogonal cover code with length $N_{SF}^{PUCCH,3}$ provided by OCC-Length-r16, $N_{sc,ctrl}^{RB}=N_{sc}^{RB}/N_{SF}^{PUCCH,3}$, and $N_{sc,ctrl}^{RB}=N_{sc}^{RB}/N_{SF}^{PUCCH,4}$ for PUCCH format 4, where $N_{sc}^{RB}$ is a number of subcarriers per resource block.

$N_{symb-UCI}^{PUCCH}$ is equal to a number of PUCCH symbols $N_{symb}^{PUCCH,2}$ for PUCCH format 2 provided by nrofSymbols in PUCCH-format2. For PUCCH format 3 or for PUCCH format 4, $N_{symb-UCI}^{PUCCH}$ is equal to a number of PUCCH symbols $N_{symb}^{PUCCH,3}$ for PUCCH format 3 or equal to a number of PUCCH symbols $N_{symb}^{PUCCH,4}$ for PUCCH format 4 provided by nrofSymbols in PUCCH-format3 or nrofSymbols in PUCCH-format4, respectively, after excluding a number of symbols used for DM-RS transmission for PUCCH format 3 or for PUCCH format 4, respectively.

$Q_m=1$ if pi/2-BPSK is the modulation scheme and $Q_m=2$ if QPSK is the modulation scheme as indicated by pi2BPSK for PUCCH format 3 or PUCCH format 4. For PUCCH format 2, $Q_m=2$.

For a HARQ-ACK only PUCCH reporting on PUCCH format 2/3/4, the payload size is determined by $O^{ACK}$, as the number of bits for HARQ-ACK for transmission on the current PUCCH, where $O^{ACK}>2$. In the case of HARQ-ACK multiplexing with different priorities on PUCCH with joint coding, the payload size may be determined by $O_{ACK}=O_{ACK\_1}+O_{ACK\_0}$ as given above.

In some examples, $O_{ACK}$ is a total number of HARQ-ACK information bits, where $O_{ACK}=O_{ACK\_1}+O_{ACK\_0} \cdot O_{CRC}$ is a number of CRC bits, if any, for encoding the number of $O_{ACK}$ HARQ-ACK bits. If $O_{ACK} <= 11$ bits, $O_{UCI}=O_{ACK}$. If $O_{ACK}>11$ bits, $O_{UCI}=O_{ACK}+O_{CRC}$, where $O_{CRC}$ is the number of CRC bits based on $O_{ACK}$.

If a UE transmits a PUCCH with $O_{ACK}$ HARQ-ACK information bits and $O_{CRC}$ bits using PUCCH format 2 or PUCCH format 3 in a PUCCH resource that incudes $M_{RB}^{PUCCH}$ PRBs, the UE may determine a number of PRBs $M_{RB,min}^{PUCCH}$ for the PUCCH transmission to be the minimum number of PRBs, that is less than or equal to a number of PRBs $M_{RB}^{PUCCH}$ provided respectively by nrofPRBs of PUCCH-format2 or nrofPRBs of PUCCH-format3 and start from the first PRB from the number of PRBs, that results to $(O_{ACK}+O_{CRC}) \leq M_{RB,min}^{PUCCH} \cdot N_{sc,ctrl}^{RB} \cdot N_{symb-UCI}^{PUCCH} \cdot Q_m \cdot r$ and, if $M_{RB}^{PUCCH}>1$, $(O_{ACK}+O_{CRC}) \leq (M_{RB,min}^{PUCCH}-1) \cdot N_{sc,ctrl}^{RB} \cdot N_{symb-UCI}^{PUCCH} \cdot Q_m \cdot r$, where $N_{sc,ctrl}^{RB}$, $N_{symb-UCI}^{PUCCH}$, $Q_m$, and r are defined above. For PUCCH format 3, if $M_{RB,min}^{PUCCH}$ is not equal to $2^{\alpha_2} \cdot 3^{\alpha_3} \cdot 5^{\alpha_5}$ according to TS 38.211, $M_{RB,min}^{PUCCH}$ is increased to the nearest allowed value of nrofPRBs for PUCCH-format3. If $(O_{ACK}+O_{CRC})>$ $(M_{RB}^{PUCCH}-1) \cdot N_{sc,ctrl}^{RB} \cdot N_{symb-UCI}^{PUCCH} \cdot Q_m \cdot r$, the UE may transmit the PUCCH over $M_{RB}^{PUCCH}$ PRBs.

If a UE is provided a first interlace of $M_{interlace,0}^{PUCCH}$ PRBs by interlace0 in InterlaceAllocation-r16 and transmits a PUCCH with $O_{ACK}$ HARQ-ACK information bits and $O_{CRC}$ bits using PUCCH format 2 or PUCCH format 3, the UE may transmit the PUCCH over the first interlace if $O_{ACK}+O_{CRC}) \leq_{interlace,0}^{PUCCH} \cdot N_{sc,ctrl}^{RB} \cdot N_{symb-UCI}^{PUCCH} \cdot Q_m \cdot r$; otherwise, if the UE is provided a second interlace by interlace1 in PUCCH-format2 or PUCCH-format3, the UE may transmit the PUCCH over the first and second interlaces.

It should be noted that for a single HARQ-ACK priority reporting, if the number of PRBs calculated based on the maxCodeRate is more than the configured number of PRBs, the configured maximum number of PRBs may be used for the PUCCH transmission. For example, if $(O_{ACK}+O_{CRC}) > (M_{RB}^{PUCCH}-1) \cdot N_{sc,ctrl}^{RB} \cdot N_{symb-UCI}^{PUCCH} \cdot Q_m \cdot r$, the UE transmits the PUCCH over $M_{RB}^{PUCCH}$ PRBs.

For HARQ-ACK multiplexing with different priorities, the same method can be applied. Thus, after a PUCCH resource is determined based on the total payload of the HARQ-ACK codebooks with different priorities, the UE may determine the number of PRBs to multiplex the coded output of the joint HARQ-ACK codebook. If the UE determines the number of PRBs to multiplex the joint HARQ-ACK codebook based on the maxCodeRate is more than the configured maximum number of PRBs.

In one approach, the configured maximum number of PRBs may be used for the PUCCH transmission. For example, if $(O_{ACK}+O_{CRC}) > M_{RB}^{PUCCH}-1) \cdot N_{sc,ctrl}^{RB} \cdot N_{symb-UCI}^{PUCCH} \cdot Q_m \cdot r$, the UE transmits the PUCCH over $M_{RB}^{PUCCH}$ PRBs. In this case, the actual maximum code rate for the UCI may be higher than the configured maxCodeRate.

In another approach, the UE may choose to drop the low priority HARQ-ACK to guarantee the performance of high priority HARQ-ACK. Thus, the HARQ-ACK codebook with priority index 0 may not be reported. The HARQ-ACK codebook with priority index 1 may be reported on a high priority HARQ-ACK PUCCH resource re-selected based on the payload of the high priority HARQ-ACK.

In yet another approach, the UE may perform some bundling methods to reduce the payload size of the low priority HARQ-ACK. The payload reduced HARQ-ACK with priority 0 can be appended to the HARQ-ACK codebook with priority 1 to create a new joint HARQ-ACK codebook. Then the UE may perform PUCCH set selection and UCI multiplexing again based on the payload of the new joint HARQ-ACK information and the maxCodeRate of the PUCCH resource.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein. In some examples, the gNB scheduling module 194 may be utilized to perform joint coding and/or multiplexing of deferred SPS HARQ-ACK as described herein. For instance, the gNB 160, the gNB operations module 182, and/or the gNB scheduling module 194 may perform one or more of the methods (e.g., method 1300 described in relation to FIG. 13, etc.), operations, functions, approaches, and/or examples described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
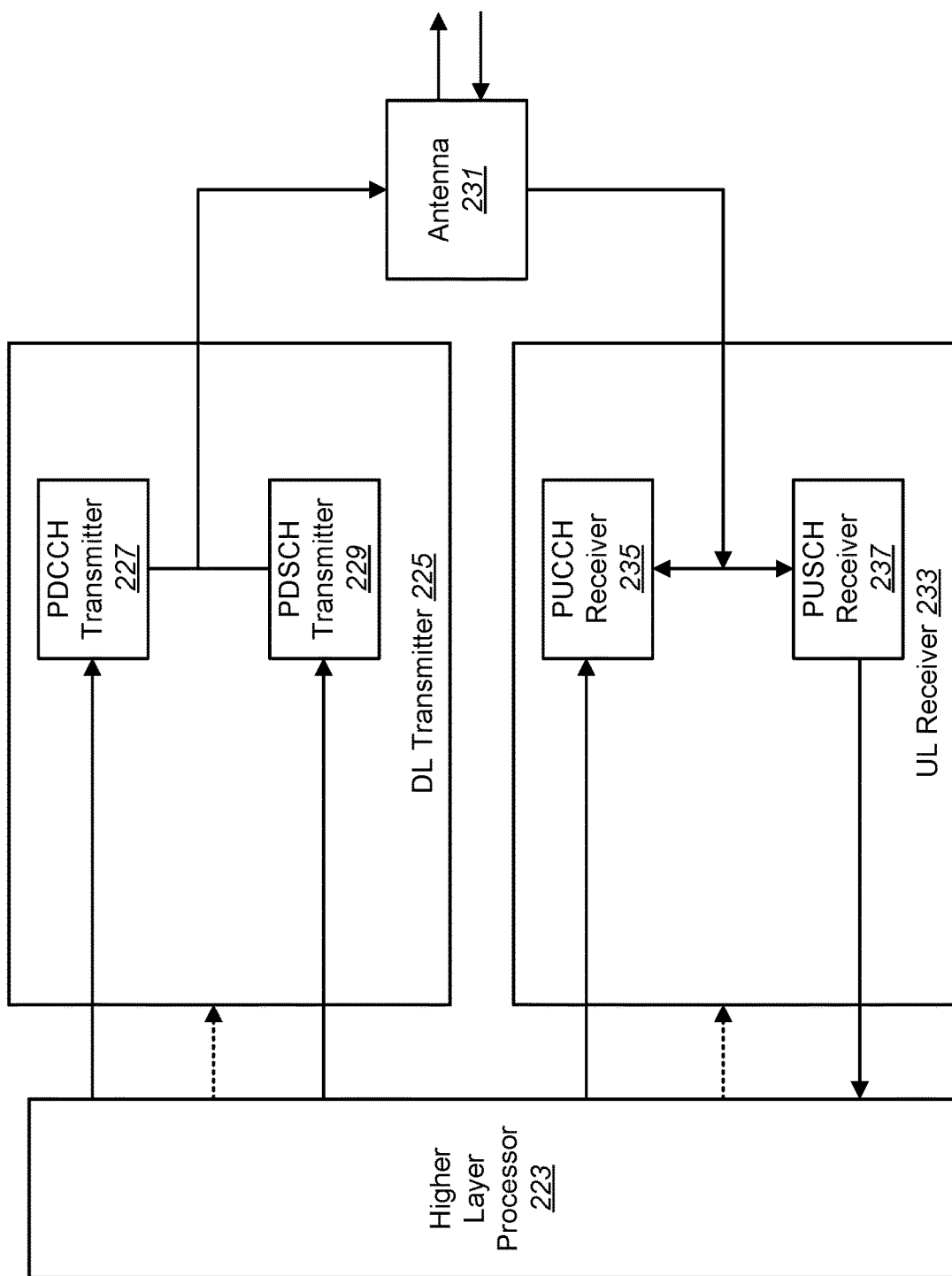
FIG. 2 is a block diagram illustrating one implementation of a gNB.

FIG. 2 is a block diagram illustrating one implementation of a gNB 260. The gNB 260 may be implemented in accordance with the gNB 160 described in connection with FIG. 1 in some examples, and/or may perform one or more of the functions described herein. The gNB 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 3:
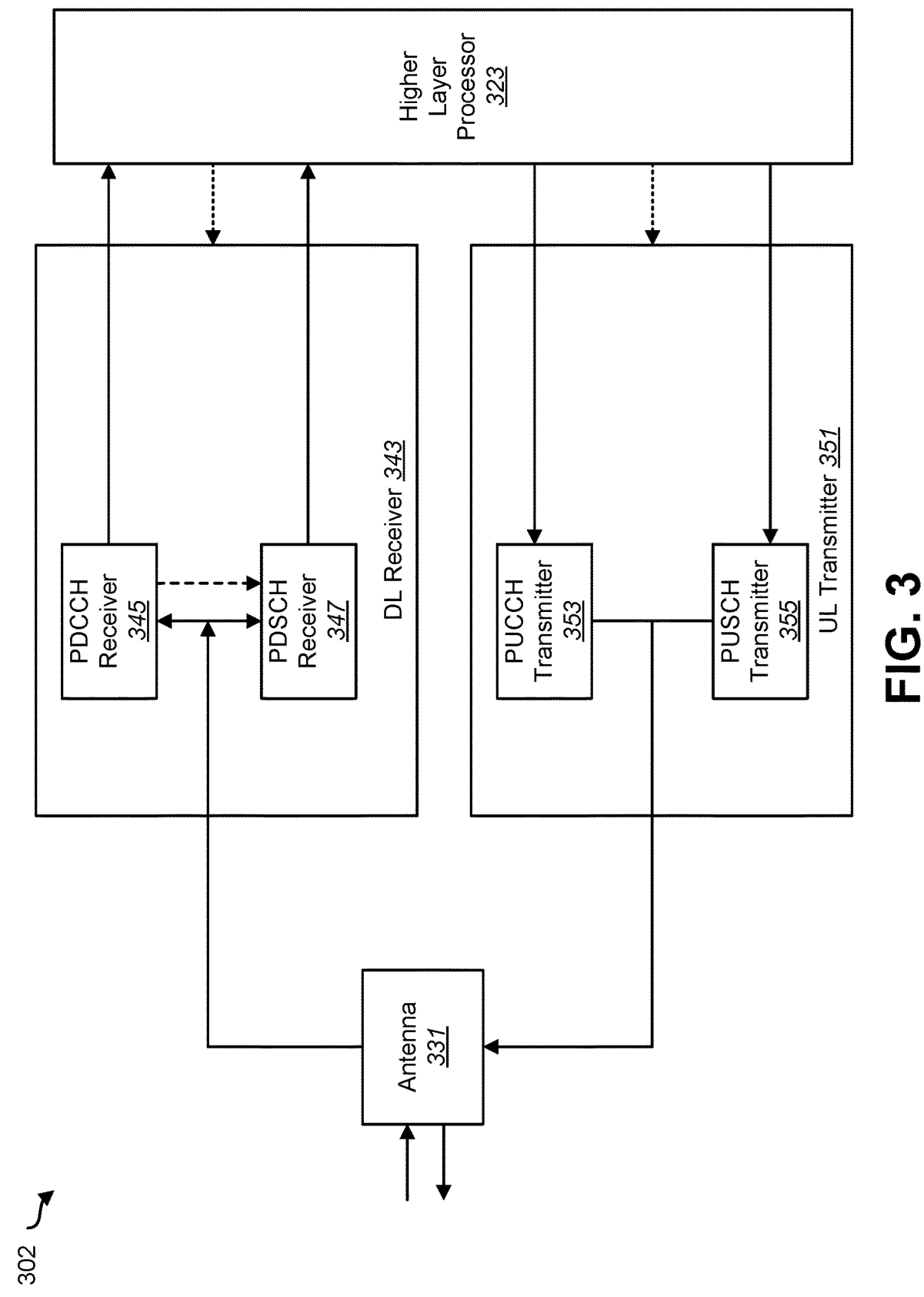
FIG. 3 is a block diagram illustrating one implementation of a UE.

FIG. 3 is a block diagram illustrating one implementation of a UE 302. The UE 302 may be implemented in accordance with the UE 102 described in connection with FIG. 1 in some examples, and/or may perform one or more of the functions described herein. The UE 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI.

The DL receiver 343 may receive multiplexed downlink physical channels and downlink physical signals via receiving antennas 331 and de-multiplex them. The PDCCH receiver 345 may provide the higher layer processor 323 DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 4:
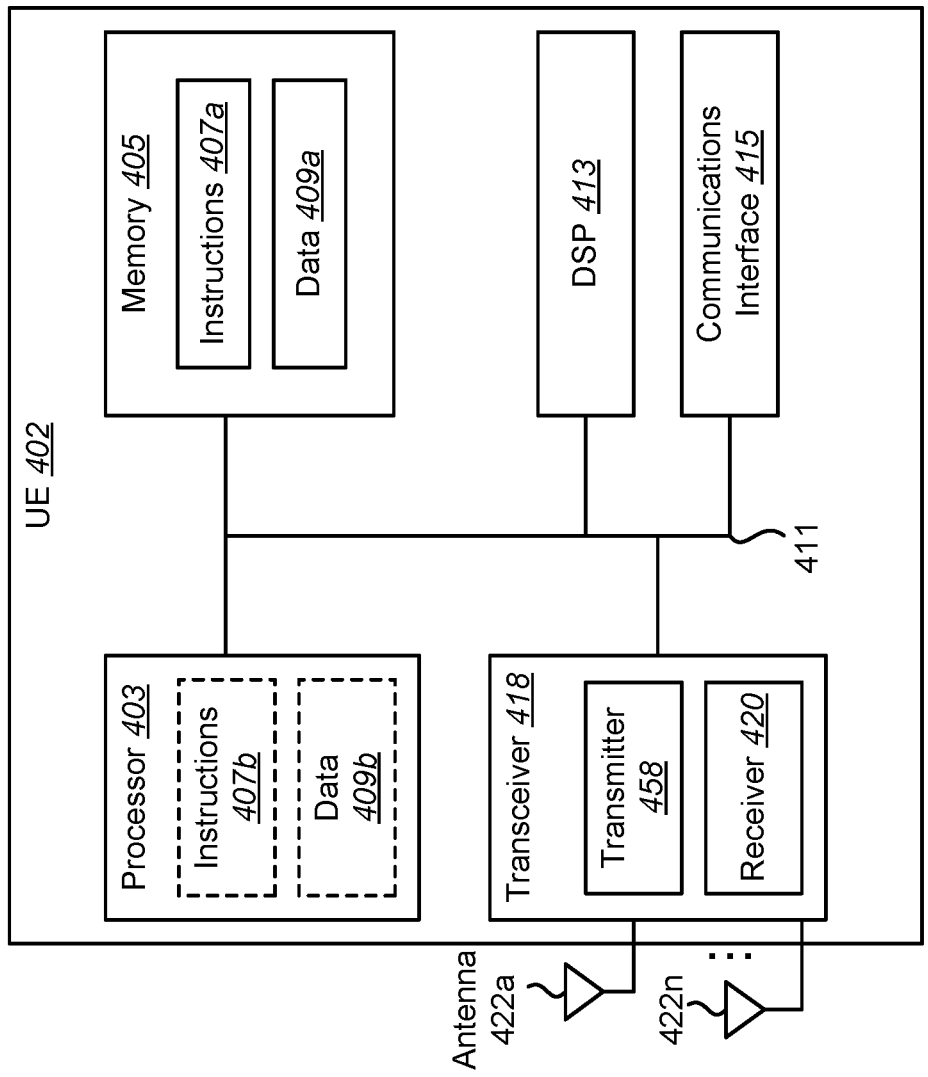
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. In some examples, the UE 402 may perform one or more of the methods, functions, operations, and/or examples, etc., described herein. The UE 402 includes a processor 403 that controls operation of the UE 402. The processor 403 may also be referred to as a central processing unit (CPU). Memory 405, which may include read-only memory (ROM), random access memory (RAM), a combination of the two or any type of device that may store information, provides instructions 407a and data 409a to the processor 403. A portion of the memory 405 may also include non-volatile random-access memory (NVRAM). Instructions 407b and data 409b may also reside in the processor 403. Instructions 407b and/or data 409b loaded into the processor 403 may also include instructions 407a and/or data 409a from memory 405 that were loaded for execution or processing by the processor 403. The instructions 407b may be executed by the processor 403 to implement the methods described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas 422a-n are attached to the housing and electrically coupled to the transceiver 418.

The various components of the UE 402 are coupled together by a bus system 411, which may include a power bus, a control signal bus, and a status signal bus, in addition to a data bus. However, for the sake of clarity, the various buses are illustrated in FIG. 4 as the bus system 411. The UE 402 may also include a digital signal processor (DSP) 413 for use in processing signals. The UE 402 may also include a communications interface 415 that provides user access to the functions of the UE 402. The UE 402 illustrated in FIG. 4 is a functional block diagram rather than a listing of specific components.

Figure 5:
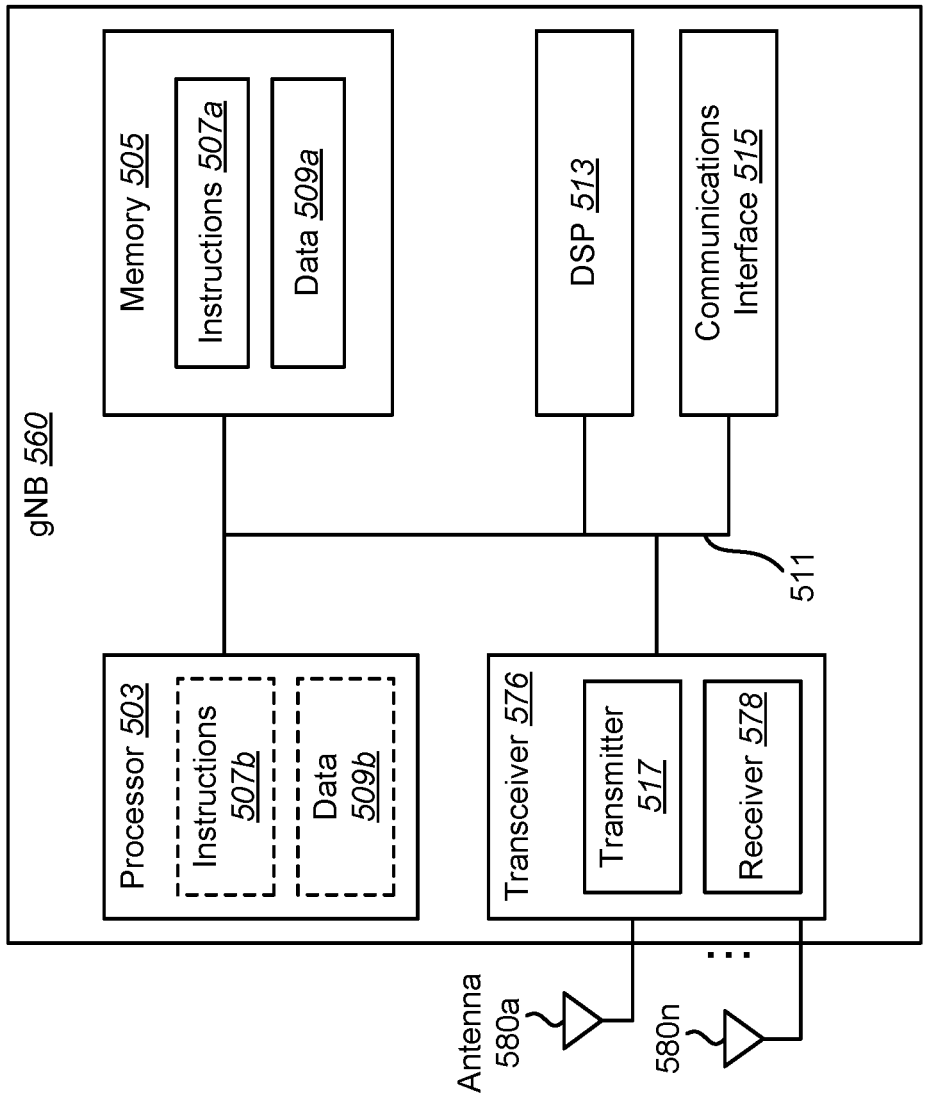
FIG. 5 illustrates various components that may be utilized in a gNB.

FIG. 5 illustrates various components that may be utilized in a gNB 560. The gNB 560 described in connection with FIG. 5 may be implemented in accordance with the gNB 160 described in connection with FIG. 1. In some examples, the gNB 560 may perform one or more of the methods, functions, operations, and/or examples, etc., described herein. The gNB 560 includes a processor 503 that controls operation of the gNB 560. The processor 503 may also be referred to as a central processing unit (CPU). Memory 505, which may include read-only memory (ROM), random access memory (RAM), a combination of the two or any type of device that may store information, provides instructions 507a and data 509a to the processor 503. A portion of the memory 505 may also include non-volatile random-access memory (NVRAM). Instructions 507b and data 509b may also reside in the processor 503. Instructions 507b and/or data 509b loaded into the processor 503 may also include instructions 507a and/or data 509a from memory 505 that were loaded for execution or processing by the processor 503. The instructions 507b may be executed by the processor 503 to implement the methods described above.

The gNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580a-n are attached to the housing and electrically coupled to the transceiver 576.

The various components of the gNB 560 are coupled together by a bus system 511, which may include a power bus, a control signal bus, and a status signal bus, in addition to a data bus. However, for the sake of clarity, the various buses are illustrated in FIG. 5 as the bus system 511. The gNB 560 may also include a digital signal processor (DSP) 513 for use in processing signals. The gNB 560 may also include a communications interface 515 that provides user access to the functions of the gNB 560. The gNB 560 illustrated in FIG. 5 is a functional block diagram rather than a listing of specific components.

Figure 6:
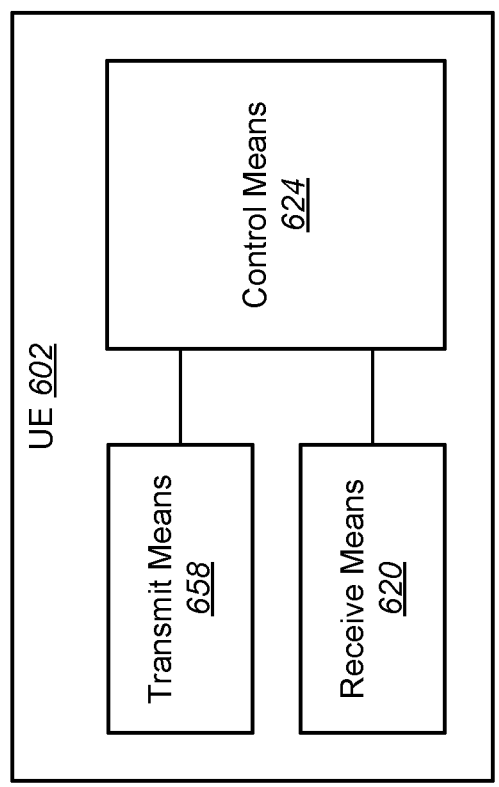
FIG. 6 is a block diagram illustrating one implementation of a UE in which the systems and methods described herein may be implemented.

FIG. 6 is a block diagram illustrating one implementation of a UE 602 in which the systems and methods described herein may be implemented. The UE 602 includes transmit means 658, receive means 620 and control means 624. The transmit means 658, receive means 620 and control means 624 may be configured to perform one or more of the functions described in connection with FIG. 1 above. FIG. 4 above illustrates one example of a concrete apparatus structure of FIG. 6. Other various structures may be implemented to realize one or more of the functions of FIG. 1. For example, a DSP may be realized by software.

Figure 7:
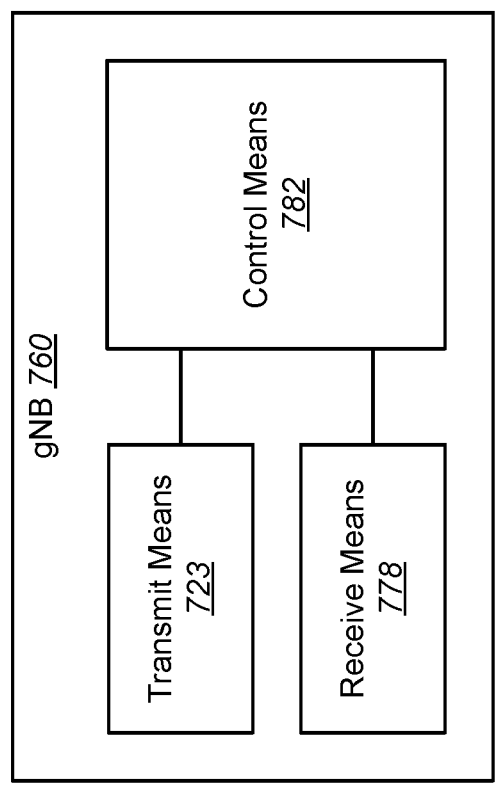
FIG. 7 is a block diagram illustrating one implementation of a gNB in which the systems and methods described herein may be implemented.

FIG. 7 is a block diagram illustrating one implementation of a gNB 760 in which the systems and methods described herein may be implemented. The gNB 760 includes transmit means 723, receive means 778 and control means 782. The transmit means 723, receive means 778 and control means 782 may be configured to perform one or more of the functions described in connection with FIG. 1 above. FIG. 5 above illustrates one example of a concrete apparatus structure of FIG. 7. Other various structures may be implemented to realize one or more of the functions of FIG. 1. For example, a DSP may be realized by software.

For XR-specific capacity enhancements, new features are supported to allow multiple configured grant (CG) PUSCH transmission occasions in a period of a single CG PUSCH configuration; and to include dynamic indication of unused CG PUSCH occasion(s) based on UCI by the UE in a CG PUSCH transmission. A CG PUSCH refers to a PUSCH transmission that is configured by a ConfiguredGrantConfig.

The UCI of unused CG PUSCH TOs, also known as UTO-UCI, should be included in every transmitted CG PUSCH for the CG configuration. In case of overlapping with a channel for HARQ-ACK feedback, some details need to be defined for the bit sequence between UTO-UCI and HARQ-ACK.

If cg-UCI-Multiplexing is provided, the HARQ-ACK and UTO-UCI can be jointly encoded and multiplexed on the CG PUSCH. The order of the sequence generation with the HARQ-ACK and UTO-UCI should be specified. Especially, different cases should be considered including:
  A single HARQ-ACK with a same priority as the priority of the CG-PUSCH.
  A single HARQ-ACK with a different priority from the priority of the CG-PUSCH.
  HARQ-ACK with different priorities on a CG PUSCH.

If cg-UCI-Multiplexing is not provided, joint coding between HARQ-ACK and UTO-UCI is not supported. To avoid dropping of important HARQ-ACK or the CG PUSCH transmission, new methods are proposed considering the different UCI and channel priorities, including:
  New multiplexing method with UCI selection.
  New dropping rules based on UCI and channel priorities.
  Separate coding rules with different number of coding chains.

For the UTO-UCI, more details should be specified on the content, including:
  The bit used to indicate the different status of a PUSCH TO.
  The start point and duration of the UTO-UCI.
  The validity timeline and override behavior of unused indication.

Joint HARQ-ACK and Unused Transmission PUSCH Occasion Uplink Control Information (UTO-UCI) Reporting for CG with Multiple PUSCH Occasions Behavior when cg-UCI-Multiplexing is provided.

In one method, if a PUCCH with a HARQ-ACK overlaps with a CG PUSCH with UTO-UCI, if cg-UCI-Multiplexing is provided, UTO-UCI and HARQ-ACK is jointly encoded by appending HARQ-ACK bits to UTO-UCI bits.

If the PUCCH includes one HARQ-ACK priority only, the order is UTO-UCI and HARQ-ACK.

If the HARQ-ACK includes both HARQ-ACK with priority index 1 and HARQ-ACK with priority index 0 (i.e. if a PUCCH with priority index 1 contains both HARQ-ACK with priority 1 and HARQ-ACK with priority 0 overlaps with the CG PUSCH, of if the CG PUSCH overlaps with two non-overlapping PUCCHs with different priorities carrying HARQ-ACK with priority 1 and HARQ-ACK with priority 0 respectively.)

Alt1: the sequence order is UTO-UCI, HARQ-ACK with priority index 1 and LP HARQ-ACK with priority index 0.

Alt2: the sequence order is UTO-UCI, HARQ-ACK with priority index 1 only, the HARQ-ACK priority index 0 is dropped.

Alt 3: Alt 1 is used if CG PUSCH has priority index 0, and Alt 2 is used if CG PUSCH has priority index 1.

In another method, if a PUCCH with a HARQ-ACK overlaps with a CG PUSCH with UTO-UCI, if cg-UCI-Multiplexing is provided, the order of the sequence for HARQ-ACK and UTO-UCI is determined by the UCI priorities.

If the PUCCH includes one HARQ-ACK priority only:
If the CG PUSCH have the same priority or a higher priority than the PUCCH for the HARQ-ACK, the sequence order is UTO-UCI, HARQ-ACK.

If the PUCCH for the HARQ-ACK has priority index 1 and CG PUSH has priority index 0, the sequence order is HARQ-ACK and UTO-UCI.

If the HARQ-ACK includes both HARQ-ACK with priority index 1 and priority index 0:
If the CG PUSCH has priority index 1,
Alt1: the sequence order is UTO-UCI, HARQ-ACK with priority index 1 and LP HARQ with priority index 0.
Alt2: the sequence order is UTO-UCI and HARQ-ACK with priority index 1. The HARQ-ACK priority index 0 is dropped.

If the CG PUSCH has priority index 0,
Alt1: the sequence order is HARQ-ACK with priority index 1, UTO-UCI and LP HARQ with priority index 0.
Alt2: the sequence order is HARQ-ACK with priority index 1 and UTO-UCI. The HARQ-ACK priority index 0 is dropped.

HARQ-ACK and Unused Transmission PUSCH Occasion Uplink Control Information (UTO-UCI) Collision Handling for CG with Multiple PUSCH Occasions Behavior when cg-UCI-Multiplexing is not provided.

If a PUCCH with a HARQ-ACK overlaps with a CG PUSCH with UTO-UCI, if cg-UCI-Multiplexing is not provided, one UCI from UTO-UCI and HARQ-ACK is selected and multiplexed on the CG PUSCH considering the channel priorities and UCI multiplexing with different priorities.

If the overlapping PUCCH contains only one HARQ-ACK codebook:

Case 1: If the PUCCH with HARQ-ACK and the CG PUSCH have same priority, or HARQ-ACK has higher priority than the CG PUSCH, UTO-UCI is dropped, and HARQ-ACK is multiplexing on the CG PUSCH.

Case 2: If the PUCCH with HARQ-ACK has higher priority than the CG PUSCH, and if the UE is provided uci-MuxWithDiffPrio and the timeline conditions are satisfied, UTO-UCI is dropped, and HARQ-ACK is multiplexing on the CG PUSCH.

Case 3: If the PUCCH with HARQ-ACK has higher priority than the CG PUSCH, and if the UE is not provided uci-MuxWithDiffPrio, the CG PUSCH with UTO-UCI is dropped, and HARQ-ACK is reported on the PUCCH.

Case 4: If the PUCCH with HARQ-ACK has lower priority than the CG PUSCH with UTO-UCI, and if the UE is provided uci-MuxWithDiffPrio and the timeline conditions are satisfied, the low priority HARQ-ACK is multiplexed on the high priority CG PUSCH, and the UTO-UCI is dropped.

Case 5: If the PUCCH with HARQ-ACK has lower priority than the CG PUSCH with UTO-UCI, and if the UE is not provided uci-MuxWithDiffPrio, the low priority HARQ-ACK is dropped, and the high priority CG PUSCH with UTO-UCI is transmitted.

Alternatively, for all 5 Cases above, regardless of the priority between the HARQ-ACK and the CG PUSCH, the UTO-UCI is always dropped, and HARQ-ACK is multiplexed on the CG PUSCH.

If the HARQ-ACK includes both HARQ-ACK with priority index 1 and HARQ-ACK with priority index 0 (i.e. if a PUCCH with priority index 1 contains both HARQ-ACK with priority 1 and HARQ-ACK with priority 0 overlaps with the CG PUSCH, or if the CG PUSCH overlaps with two non-overlapping PUCCHs with different priorities carrying HARQ-ACK with priority 1 and HARQ-ACK with priority 0 respectively.)

Option 1: Only HARQ-ACK with priority index 1 is multiplexed on the CG PUSCH, UTO-UCI and HARQ-ACK with priority index 0 are dropped.

Option 2: Both HARQ-ACK with priority index 1 and HARQ-ACAK with priority index 0 are multiplexed on the CG PUSCH, UTO-UCI is dropped.

Option 3: Option 1 is used if CG PUSCH has priority index 1, and Option 2 is used if CG PUSCH has priority index 0.

If cg-UCI-Multiplexing is not provided, separate coding may be considered as long as the maximum number of coding chains on the PUSCH is not exceeded.

The order of multiplexing is determined by the priorities of the UCIs, including HARQ-ACK codebooks with different priorities and the UTO-UCI.

The beta offset of each UCI is determined separately based on the UCI type and priority and the CG PUSCH priority.

If only one HARQ-ACK codebook in the overlapping PUCCH:
If the PUCCH and CG-PUSCH have the same priority:
Option 1: HARQ-ACK is multiplexed on CG PUSCH, UTO-UCI is dropped. (1 coding chain)
Option 2: UTO-UCI is multiplexed first, HARQ-ACK is multiplexed next on CG PUSCH. (2 coding chains)

Option 3: HARQ-ACK is multiplexed first, UTO-UCI is multiplexed next on CG PUSCH. (2 coding chains)

If the PUCCH and CG PUSCH have different priorities:
   If the HARQ-ACK has higher priority than CG PUSCH, HARQ-ACK is multiplexed first, UTO-UCI is multiplexed next on CG PUSCH. (2 coding chains)
   If the HARQ-ACK has lower priority than CG PUSCH, UTO-UCI is multiplexed first, HARQ-ACK is multiplexed next on CG PUSCH. (2 coding chains)

If both high priority HARQ-ACK and low priority HARQ-ACK are present in overlapping PUCCH or PUCCH(s):
   If CG PUSCH has priority index 1, UTO-UCI also has priority index 1.
      Option 1: only HARQ-ACK with priority index 1 is multiplexed on the CG PUSCH, UTO-UCI and HARQ-ACK with priority index 0 are dropped. (1 coding chain for HP HARQ-ACK)
      Option 2: HARQ-ACK with priority index 1 and HARQ-ACK with priority index 0 are multiplexed with separate coding chains; UTO-UCI is dropped. (2 coding chains: HP HARQ-ACK+LP HARQ-ACK)
      Option 3: HARQ-ACK with priority index 1 and UTO-UCI are multiplexed with separate coding chains; HARQ-ACK with priority index 0 is dropped. (2 coding chains: HP HARQ-ACK+UTO-UCI, or UTO-UCI+HP HARQ-ACK)
      Option 4: HARQ-ACK with priority index 1, UTO-CUI and HARQ-ACK with priority index 0 are multiplexed with separate coding chains. (3 coding chains: HP HARQ-ACK+UTO-UCI+LP HARQ-ACK, or UTO-UCI+HP HARQ-ACK+LP HARQ-ACK)
      Option 5: HARQ-ACK with priority index 1, HARQ-ACK with priority index 0 and UTO-UCI are multiplexed with separate coding chains (3 coding chains: HP HARQ-ACK+LP HARQ-ACK+UTO-UCI)
   If CG PUSCH has priority index 0, UTO-UCI also has priority index 0.
      Option 1: only HARQ-ACK with priority index 1 is multiplexed on the CG PUSCH, UTO-UCI and HARQ-ACK with priority index 0 are dropped. (1 coding chain for HP HARQ-ACK)
      Option 2: HARQ-ACK with priority index 1 and HARQ-ACK with priority index 0 are multiplexed with separate coding chains; UTO-UCI is dropped. (2 coding chains: HP HARQ-ACK+LP HARQ-ACK)
      Option 3: HARQ-ACK with priority index 1 and UTO-UCI are multiplexed with separate coding chains; HARQ-ACK with priority index 0 is dropped. (2 coding chains: HP HARQ-ACK+UTO-UCI)
      Option 4: HARQ-ACK with priority index 1, UTO-CUI and HARQ-ACK with priority index 0 are multiplexed with separate coding chains. (3 coding chains: HP HARQ-ACK+UTO-UCI+LP HARQ-ACK)
      Option 5: HARQ-ACK with priority index 1, HARQ-ACK with priority index 0 and UTO-UCI are multiplexed with separate coding chains (3 coding chains: HP HARQ-ACK+LP HARQ-ACK+UTO-UCI)

Unused Transmission PUSCH Occasion Uplink Control Information (UTO-UCI) for CG with Multiple PUSCH Occasions The UTO-UCI provides a bitmap where a bit corresponds to a TO within a time duration/range. The bit indicates whether the TO is "unused."
   Approach 1: a bit of "0" indicates that the corresponding PUSCH TO is "unused", and a bit of "1" indicates that the corresponding PUSCH TO is "not unused".
   Approach 2: a bit of "1" indicates that the corresponding PUSCH TO is "unused", and a bit of "0" indicates that the corresponding PUSCH TO is "not unused".

The UE is not expected to transmit in a PUSCH TO that is indicated as "unused", and the UE may or may not transmit a PUSCH in a PUSCH TO that is indicated as "not unused".

The UTO-UCI bits are determined by a starting position and a duration, where each bit corresponding to a PUSCH TO in the defined region.
   The starting position may be:
      the current PUSCH TO, or
      the next PUSCH TO, or
      with a processing delay after the current PUSCH transmission, where the delay parameter may be fixed in the specification, or configured by higher layer signaling, and/or determined by UE capabilities.
   The duration of the UTO-UCI bit map may be:
      the same as the periodicity
      defined as a time range or a number of PUSCH TOs
         There is a tradeoff between the UCI payload and indication accuracy based on length of the duration.
         The duration may be configured by higher layer signaling or updated by DCI indication.
   Additional range parameter can be applied to determine the validity and override behavior of the "unused" indication.
      The range is within the duration, and is from the beginning of the UTO-UCI, i.e. from the earliest PUSCH TO indication.
      The "unused" indication within the range should not be changed by later UTO-UCI indication.
      The "unused" indication outside the range may be modified by later UTO-UCI indication.

3GPP XR Study Information

The RAN Study Item on XR Enhancements for NR has identified several enhancements for the support for XR services. This work item aims at specifying those enhancements.
   Specify the enhancements related to power saving:
   DRX support of XR frame rates corresponding to non-integer periodicities (through at least semi-static mechanisms e.g. RRC signaling) (RAN2).
   Specify the enhancements related to capacity:
   Multiple Configured Grant (CG) PUSCH transmission occasions in a period of a single CG PUSCH configuration (RAN1, RAN2);
   Dynamic indication of unused CG PUSCH occasion(s) based on Uplink Control Information (UCI) by the UE (RAN1, RAN2);
   Buffer Status Report (BSR) enhancements including at least new Buffer Status Table(s) (RAN2);
   Delay reporting of buffered data in uplink (RAN2);

Discard operation of PDU Sets for DL and UL (RAN2, RAN3);

Specify the enhancements for XR Awareness:

Signaling by CN of semi-static information per QoS flow (e.g. PDU set QoS parameters), dynamic information per PDU set (PDU Set information and Identification) and End of Data Burst indication (RAN3, RAN2);

Impact of identifying by UE of PDU Sets, Data bursts and PSI, as needed (RAN2);

Provisioning by UE of XR traffic assistance information e.g. periodicity, UL traffic arrival information (RAN2, RAN3);

Support signaling the congestion information from RAN to the CN in alignment with SA2 (RAN3);

Among the above objectives, RAN1 is tasked to carry out the normative work for the enhancements defined by the following two objectives:

Multiple CG PUSCH transmission occasions in a period of a single CG PUSCH configuration (RAN1, RAN2);

Dynamic indication of unused CG PUSCH occasion(s) based on UCI by the UE (RAN1, RAN2);

RAN1 made many agreements in the related topics, with some detailed aspects for further study. In this present disclosure, we focus on remaining for further study (FFS) issues and propose methods to solve these issues.

With respect to the dynamic indication of unused CG PUSCH occasion(s) based on UCI by the UE, several detailed aspects were discussed with many agreements as shown below.

On the content of the UTO-UCI, the term "UTO-UCI" refers to the "UCI that provides information about unused CG PUSCH transmission occasions" for convenience. The UTO-UCI provides a bitmap where a bit corresponds to a TO within a time duration/range. The bit indicates whether the TO is "unused".

For further study (FFS): Details including time duration/range

For dynamic indication of unused CG PUSCH transmission occasion(s) based on a UCI, the indicated "unused" CG PUSCH TO(s), if any, by the UCI in a CG PUSCH for a CG configuration:

can be consecutive or non-consecutive CG PUSCH TO(s) in time domain [in one CG period]

FFS whether/how the unused TO(s) can be associated to multiple CG configuration.

On when and how the UTO-UCI is sent:

For a CG PUSCH configuration, the UTO-UCI is included in every CG PUSCH that is transmitted.

FFS details

With respect to PHY two-level priority, for a configured grant PUSCH configuration, the "UTO-UCI" has the same priority level as the configured grant PUSCH.

The UCI that provides information about unused CG PUSCH transmission occasions is defined as a "new UCI".

The existing CG-UCI encoding and multiplexing procedures are reused for encoding the "UTO-UCI" in a configured grant PUSCH in absence or presence of other UCIs being multiplexed in the PUSCH, by applying the following adjustments:

The "UTO-UCI" is used instead of CG-UCI in the corresponding procedures for encoding of CG-UCI and/or HARQ-ACK, whichever is present.

For determining the beta-offset:

Beta offset is configured for the "UTO-UCI"

If UTO-UCI and HARQ-ACK is not jointly encoded, the beta offset for the "UTO-UCI" is used in the procedures instead of CG-UCI beta offset If UTO-UCI and HARQ-ACK is jointly encoded, HARQ-ACK beta offset is used in the procedures instead of CG-UCI beta offset FFS on sequence generation order between UTO-UCI and HARQ-ACK FFS on dropping rule between UTO-UCI and HARQ-ACK when joint encoding is not configured The existing methods for CG-UCI multiplexing on PUSCH with CG-UCI are given below.

HARQ-ACK and CG-UCI

When higher layer parameter cg-UCI-Multiplexing is configured, the UCI bit sequence $a_0, a_1, a_2, a_3, \ldots, a_{A-1}$ is determined as follows, where $A=O^{CG\text{-}UCI}+O^{ACK}$.

The CG-UCI bits are mapped to the UCI bit sequence $a_0, a_1, a_2, a_3, \ldots, a_{O^{CG\text{-}UCI}-1}$, where $a_i = \tilde{o}_i^{CG\text{-}UCI}$ for $i=0, 1, \ldots, O^{CG\text{-}UCI}-1$. The CG-UCI bit sequence $\tilde{o}_0^{CG\text{-}UCI}, \tilde{o}_1^{CG\text{-}UCI}, \ldots, \tilde{o}_{O^{CG\text{-}UCI}-1}^{CG\text{-}UCI}$ is given by Table 6.3.2.1.3-1 mapped in the order from upper part to lower part, and $O^{CG\text{-}UCI}$ is number of CG-UCI bits;

The HARQ-ACK bits are mapped to the UCI bit sequence $a_{O^{CG\text{-}UCI}}, a_{O^{CG\text{-}UCI}+1}, \ldots, a_{O^{CG\text{-}UCI}+O^{ACK}-1}$, where $a_{i+O^{CG\text{-}UCI}} = \tilde{o}_i^{ACK}$ for $i=0, 1, \ldots, O^{ACK}-1$. The HARQ-ACK bit sequence $\tilde{o}_0^{ACK}, \tilde{o}_1^{ACK}, \ldots, \tilde{o}_{O^{ACK}-1}^{ACK}$ is given by Clause 9.1 of [5, TS38.213], and $O^{ACK}$ is number of HARQ-ACK bits.

When a UE would multiplex HARQ-ACK information in a PUSCH transmission that is configured by a ConfiguredGrantConfig, and includes CG-UCI [5, TS 38.212], the UE multiplexes the HARQ-ACK information in the PUSCH transmission if the UE is provided cg-UCI-Multiplexing; otherwise, if the HARQ-ACK information and the PUSCH have same priority index, the UE does not transmit the PUSCH and multiplexes the HARQ-ACK information in a PUCCH transmission or in another PUSCH transmission; if the HARQ-ACK information and the PUSCH have different priority indexes, the UE does not transmit the channel with the smaller priority index.

For a PUSCH transmission that is configured by a ConfiguredGrantConfig and includes CG-UCI, the UE multiplexes CG-UCI in the PUSCH transmission if the UE is provided by betaOffsetCG-UCI a $I_{offset}^{CG\text{-}UCI}$ value, from a set of values, with the mapping defined in Table 9.3-1. If the UE is provided cg-UCI-Multiplexing and multiplexes HARQ-ACK information in the PUSCH transmission, as described in clauses 9 and 9.2.5, the UE jointly encodes the HARQ-ACK information and the CG-UCI [5, TS 38.212] and determines a number of resources for multiplexing the combined information in a PUSCH using $\beta_{offset}^{HARQ\text{-}ACK}$ which provides indexes $I_{offset,1}^{HARQ\text{-}ACK}$ and $I_{offset,2}^{HARQ\text{-}ACK}$ for the UE to use if the UE multiplexes up to 11, and more than 11 combined information bits, respectively.

If the PUSCH transmission is with a configured grant and the UE is provided CG-UCI-OnPUSCH='semiStatic', the UE applies the $\beta_{offset}^{HARQ\text{-}ACK}$, $\beta_{offset}^{CSI\text{-}1}$, and $\beta_{offset}^{CSI\text{-}2}$ values that are provided by CG-UCI-OnPUSCH='semiStatic' for the corresponding HARQ-ACK information, Part 1 CSI reports and Part 2 CSI reports. If the PUSCH transmission has priority 0 or priority 1 and the UE is configured by uci-MuxWithDiffPrio to multiplex HARQ-ACK information of priority 1 or priority 0, respectively, and if the UE multiplexes HARQ-ACK information of priority 1 or priority 0, the UE applies corresponding $\beta_{offset}^{HARQ-ACK,1}$ or $\beta_{offset}^{HARQ-ACK,0}$ provided by cg-betaOffsetsCrossPri1='semiStatic' or cg-betaOffsetsCrossPri0='semiStatic', respectively.

If the PUSCH transmission is scheduled by DCI format 0_0 and the UE is provided betaOffsets='dynamic', the UE applies the $\beta_{offset}^{HARQ-ACK}$, $\beta_{offset}^{CSI-1}$ and $\beta_{offset}^{CSI-2}$ values that are determined from the first value of betaOffsets='dynamic'. If the UE is configured by uci-MuxWithDiffPrio to multiplex HARQ-ACK information of priority 1, the UE applies corresponding $\beta_{offset}^{HARQ-ACK,1}$ provided by the first value of betaOffsetCrossPri1='dynamic'.

If the PUSCH transmission is a configured grant Type 2 PUSCH and the UE is provided CG-UCI-OnPUSCH='dynamic', the UE applies the $\beta_{offset}^{HARQ-ACK}$, $\beta_{offset}^{CSI-1}$, and $\beta_{offset}^{CSI-2}$ values that are determined from the first value of CG-UCI-OnPUSCH='dynamic'. If the PUSCH transmission has priority 0 or priority 1 and the UE is configured by uci-MuxWithDiffPrio to multiplex HARQ-ACK information of priority 1 or priority 0, respectively, and if the UE multiplexes HARQ-ACK information of priority 1 or priority 0, the UE applies corresponding $\beta_{offset}^{HARQ-ACK,1}$ or $\beta_{offset}^{HARQ-ACK,0}$ provided by the first value of cg-betaOffsetsCrossPri1='dynamic' or cg-betaOffsetsCrossPri0='dynamic', respectively.

HARQ-ACK information offsets $\beta_{offset}^{HARQ-ACK}$ are configured to values according to Table 9.3-1. The betaOffsetACK-Index1, betaOffsetACK-Index2, and betaOffsetACK-Index3 respectively provide indexes $I_{offset,0}^{HARQ-ACK}$, $I_{offset,1}^{HARQ-ACK}$, $I_{offset,2}^{HARQ-ACK}$ for the UE to use if the UE multiplexes up to 2 HARQ-ACK information bits, more than 2 and up to 11 HARQ-ACK information bits, and more than 11 bits in the PUSCH, respectively.

Offsets $\beta_{offset}^{HARQ-ACK,0}$ for multiplexing HARQ-ACK information with priority 0 in a PUSCH transmission with priority 1 are configured to values according to Table 9.3-1. The first, second and third values provided by any of BetaOffsetsCrossPri0, betaOffsetsCrossPri0DCI-0-2, or cg-betaOffsetsCrossPri0 respectively provide indexes $I_{offset,0}^{HARQ-ACK,0}$, $I_{offset,1}^{HARQ-ACK,0}$, $I_{offset,2}^{HARQ-ACK,0}$ for the UE to use if the UE multiplexes up to 2 bits, more than 2 and up to 11 bits, and more than 11 bits of HARQ-ACK information with priority 0 in the PUSCH transmission with priority 1, respectively.

Offsets $\beta_{offset}^{HARQ-ACK,1}$ for multiplexing HARQ-ACK information with priority 1 in a PUSCH transmission with priority 0 are configured to values according to Table 9.3-1. The first, second and third values provided by any of BetaOffsetsCrossPri1, betaOffsetsCrossPri1DCI-0-2, or cg-betaOffsetsCrossPri1 respectively provide indexes $I_{offset,0}^{HARQ-ACK,1}$, $I_{offset,1}^{HARQ-ACK,1}$, $I_{offset,2}^{HARQ-ACK,1}$ for the UE to use if the UE multiplexes up to 2 bits, more than 2 and up to 11 bits, and more than 11 bits of HARQ-ACK information with priority 1 in the PUSCH transmission with priority 0, respectively.

CG-UCI-Multiplexing

If present, this field indicates that in the case of PUCCH overlapping with CG PUSCH(s) within a PUCCH group, the CG-UCI and HARQ-ACK are jointly encoded (as shown in TS 38.213, clause 9).

A PUSCH or a PUCCH transmission other than PUCCH transmissions with SL HARQ-ACK reports, including repetitions if any, can be of priority index 0 or of priority index 1. For a configured grant PUSCH transmission, a UE determines a priority index from phy-PriorityIndex, if provided. For a PUCCH transmission with HARQ-ACK information corresponding to a SPS PDSCH reception or a SPS PDSCH release, a UE determines a priority index from harq-CodebookID, if provided. For a PUCCH transmission with SR, a UE determines the corresponding priority as described in clause 9.2.4. For a PUSCH transmission with semi-persistent CSI report, a UE determines a priority index from a priority indicator field, if provided, in a DCI format that activates the semi-persistent CSI report. If a priority index is not provided to a UE for a PUSCH or a PUCCH transmission other than PUCCH transmissions with SL HARQ-ACK reports, the priority index is 0.

If a UE is provided pdsch-HARQ-ACK-CodebookList, the UE can be indicated by pdsch-HARQ-ACK-CodebookList to generate one or two HARQ-ACK codebooks. If the UE is indicated to generate one HARQ-ACK codebook, the HARQ-ACK codebook is associated with a PUCCH of priority index 0. If a UE is provided pdsch-HARQ-ACK-CodebookList, the UE multiplexes in a same HARQ-ACK codebook only HARQ-ACK information associated with a same priority index. If the UE is indicated to generate two HARQ-ACK codebooks:

a first HARQ-ACK codebook is associated with a PUCCH of priority index 0 and a second HARQ-ACK codebook is associated with a PUCCH of priority index 1.

The HARQ-ACK priority index of a PDSCH transmission is determined by the priority index of the PDSCH. For HARQ-ACK reporting on PUCCH without multiplexing of HARQ-ACK of different priorities, a PUCCH resource with the same priority index as the HARQ-ACK priority index is used. For HARQ-ACK reporting on PUCCH with HARQ-ACK of different priorities, a PUCCH resource with priority index 1 is selected to report the HARQ-ACK with different priorities.

For a multi-PUSCH CG, the UTO-UCI priority is the same as the priority of the CG PUSCH. If priority is not indicated in the CG PUSCH configuration, it is assumed to be priority index 0.

Joint HARQ-ACK and Unused Transmission PUSCH Occasion Uplink Control Information (UTO-UCI) Reporting for CG with Multiple PUSCH Occasions In existing methods for CG-UCI multiplexing on PUSCH with CG-UCI, if cg-UCI-Multiplexing is provided, the HARQ-ACK is joint coded with CG-UCI where the HARQ-ACK bits are appended to the CG-UCI bits. The HARQ-ACK and the CG-UCI may have different priorities if the UE is provided uci-MuxWithDiffPrio and the timeline conditions for multiplexing UCI in a PUCCH or a PUSCH are satisfied. Depending on the priorities of the PUSCH and the HARQ-ACK, the corresponding $\beta_{offset}^{HARQ-ACK}$ for multiplexing HARQ-ACK is determined as described above, e,g, $\beta_{offset}^{HARQ-ACK,1}$ or $\beta_{offset}^{HARQ-ACK,0}$.

On the other hand, if cg-UCI-Multiplexing is not provided, a priority based handling is performed. Thus, a high priority channel is transmitted if the channels have different priorities. For the same priority, a CG PUSCH with CG-UCI is dropped and the HARQ-ACK is reported on a PUCCH instead.

Existing CG-UCI is applicable only for CG PUSCH on unlicensed carriers, i.e. NR-Unlicensed (NR-U). The CG-UCI includes critical information for the current CG PUSCH transmission, including the HARQ process number, the redundant version, etc. Thus, the gNB cannot decode a NR-U CG PUSCH without the CG-UCI, and the CG PUSCH and CG-UCI should always be transmitted together or dropped together.

In comparison, the UTO-UCI is introduced for multi-PUSCHs CG, i.e. a CG with multiple PUSCH transmissions in a period. The multi-PUSCH CG is mainly for licensed carriers, and the HARQ process number for each PUSCH transmission is determined by a formula. The gNB and the UE have the same understanding on the HARQ process number for each PUSCH transmission. The UTO-UCI is an additional information for unused TOs in the multi-PUSCH instances, and is included in every PUSCH transmission. The content of the UTO-UCI may be updated in every PUSCH transmission. Thus, the miss of the UTO-UCI in a PUSCH will not impact the PUSCH reception at the gNB if a defined procedure is followed.

In case of HARQ-ACK collision with a CG PUSCH with UTO-UCI, if cg-UCI-Multiplexing is provided, UTO-UCI and HARQ-ACK is jointly encoded. On the sequence generation order between UTO-UCI and HARQ-ACK for joint encoding and reporting, several methods can be considered.
Method 1: The Sequence is in the Order of UTO-UCI and HARQ-ACK.

In this method, if a PUCCH contains HARQ-ACK codebook overlaps with the CG PUSCH, the sequence for joint coding is in the order of UTO-UCI and HARQ-ACK, i.e. the HARQ-ACK is appended to the UTO-UCI. This is similar to existing CG-UCI method by replacing CG-UCI with UTO-UCI.

In one case, if a PUCCH contains only one HARQ-ACK codebook overlaps with the CG PUSCH with the same or different priority, the sequence for joint coding is in the order of HARQ-ACK and UTO-UCI. In a special case, if the total number of HARQ-ACK bits is two bits with different priorities, i.e. 1 bit of HARQ-ACK with priority 1 and 1 bit of HARQ-ACK bit with priority 0, the two HARQ-ACK bits are jointly coded on a PUCCH format 0/1 assuming they are all priority index 1. Thus, for multiplexing with UTO-UCI, the two HARQ-ACK bits can be treated as one HARQ-ACK codebook with priority index 1.

In another case, if a PUCCH contains both HARQ-ACK with priority 1 and HARQ-ACK with priority 0 overlaps with the CG PUSCH, or if the CG PUSCH overlaps with two non-overlapping PUCCHs contains HARQ-ACK with priority 1 and HARQ-ACK with priority 0 respectively, how to perform joint coding of HARQ-ACK and UTO-UCI should be further determined.

In one alternative (Alternative 1), the sequence is generated in the order of UTO-UCI, HP HARQ-ACK and LP HARQ-ACK. Thus, the HARQ-ACK with priority index 1 is appended to UTO-UCI first, and the HARQ-ACK with priority index 0 is appended after the HARQ-ACK with priority index 1.

In another alternative (Alternative 2), only HARQ-ACK with priority index 1 is included. Thus, the sequence is generated in the order of UTO-UCI and HARQ-ACK with priority index 1. The HARQ-ACK with priority index 1 is appended to UTO-UCI, and the HARQ-ACK with priority index 0 is dropped. This may be applied for any payload sizes of the HARQ-ACK. In a special case, if the total number of HARQ-ACK bits is two bits with different priorities, i.e. 1 bit of HARQ-ACK with priority 1 and 1 bit of HARQ-ACK bit with priority 0, the two HARQ-ACK bits are jointly coded on a PUCCH format 0/1 assuming they are all priority index 1. Thus, if the total number of HARQ-ACK bits is two bits, the 2 HARQ-ACK bits can be treated as high priority and appended to the UTO-UCI, as in Alternative 1.

Yet in another alternative (Alternative 3), the HARQ-ACK is determined by the CG PUSCH priority. If the CG PUSCH is with priority index 1, only HARQ-ACK with priority index 1 is appended to the UTO-UCI, i.e. Alternative 2 is applied. If the CG PUSCH is with priority index 0, both HARQ-ACK with priority index 1 and HARQ-ACK with priority index 0 are appended to the UTO-UCI, i.e. Alternative 1 is applied.
Method 2: The Sequence is in the Order of HARQ-ACK and UTO-UCI.

This is different from existing CG-UCI method. As shown above, UTO-UCI is not as important as a CG-UCI and HARQ-ACK. Thus, the sequency can put HARQ-ACK first, followed by the UTO-UCI.

In one case, if a PUCCH contains only one HARQ-ACK codebook overlaps with the CG PUSCH with the same or different priority, the sequence for joint coding is in the order of HARQ-ACK and UTO-UCI.

In another case, if a PUCCH contains both HARQ-ACK with priority 1 and HARQ-ACK with priority 0 overlaps with the CG PUSCH, or if the CG PUSCH overlaps with two PUCCHs contains HARQ-ACK with priority 1 and HARQ-ACK with priority 0 respectively, how to perform joint coding of HARQ-ACK and UTO-UCI should be further determined.

In another alternative (Alternative 1), the sequence is generated in the order of HP HARQ-ACK, LP HARQ-ACK and UTO-UCI. Thus, the HARQ-ACK with priority index 0 is appended to HARQ-ACK with priority index 1 first, and the UTO-UCI His appended after the ARQ-ACK with priority index 0. Yet in another alternative (Alternative 2), only HARQ-ACK with priority index 1 is included. Thus, the sequence is generated in the order of HARQ-ACK with priority index 1 and UTO-UCI. The UTO-UCI is appended to HARQ-ACK with priority index 1, and the HARQ-ACK with priority index 0 is dropped. This may be applied for any payload sizes of the HARQ-ACK. In a special case, if the total number of HARQ-ACK bits is two bits with different priorities, i.e. 1 bit of HARQ-ACK with priority 1 and 1 bit of HARQ-ACK bit with priority 0, the two HARQ-ACK bits are jointly coded on a PUCCH format 0/1 assuming they are all priority index 1. Thus, if the total number of HARQ-ACK bits is two bits, the 2 HARQ-ACK bits can be treated as high priority, and the UTO-UCI is appended the 2 HARQ-ACK bits, as in Alternative 1.

Yet in another alternative (Alternative 3), the HARQ-ACK is determined by the CG PUSCH priority. If the CG PUSCH is with priority index 1, only HARQ-ACK with priority index 1 is appended to the UTO-UCI, i.e. Alternative 2 is applied. If the CG PUSCH is with priority index 0, both HARQ-ACK with priority index 1 and HARQ-ACK with priority index 0 are appended to the UTO-UCI, i.e. Alternative 1 is applied.

From the performance point of view, there is no difference between Method 1 and Method 2. Thus, if only Method 1 and Method 2 are considered, it is better to apply the same order as CG-UCI by replacing CG-UCI with UTO-UCI, i.e. adopt Method 1.
Method 3: The Order of the Sequence for HARQ_ACK and UTO-UCI is Determined by the UCI Priorities The sequence can be based on the UCI priority, UCI with higher priority is in the front. In case of same priority, the UTO-UCI is in the front of the HARQ-ACK.

In one case, if a PUCCH contains only one HARQ-ACK codebook overlaps with the CG PUSCH, and
if the PUCCH with HARQ-ACK and the CG PUSCH have the same priority, or if CG PUSCH has a higher priority than the PUCCH with HARQ-ACK, the sequence for joint coding is in the order of UTO-UCI and HARQ-ACK.

if the PUCCH with HARQ-ACK has priority index 1 and the CG PUSCH has priority index 0, the sequence for joint coding is in the order of HARQ-ACK and UTO-UCI.

In a special case, if the total number of HARQ-ACK bits is two bits with different priorities, i.e. 1 bit of HARQ-ACK with priority 1 and 1 bit of HARQ-ACK bit with priority 0, the two HARQ-ACK bits are jointly coded on a PUCCH format 0/1 assuming they are all priority index 1. Thus, for multiplexing with UTO-UCI, the two HARQ-ACK bits can be treated as one HARQ-ACK codebook with priority index 1.

In another case, if a PUCCH with priority index 1 contains both HARQ-ACK with priority 1 and HARQ-ACK with priority 0 overlaps with the CG PUSCH, or if the CG PUSCH overlaps with two non-overlapping PUCCHs with different priorities carrying HARQ-ACK with priority 1 and HARQ-ACK with priority 0 respectively, how to perform joint coding of HARQ-ACK and UTO-UCI should be further determined.

If the CG PUSCH has priority index 1, in one alternative, the sequence is generated in the order of UTO-UCI, HP HARQ-ACK and LP HARQ-ACK. Thus, the HARQ-ACK with priority index 1 is appended to UTO-UCI first, and the HARQ-ACK with priority index 0 is appended after the HARQ-ACK with priority index 1. In another alternative, only HARQ-ACK with priority index 1 is included. Thus, the sequence is generated in the order of UTO-UCI and HARQ-ACK with priority index 1, i.e. the HARQ-ACK with priority index 1 is appended to UTO-UCI, and the HARQ-ACK with priority index 0 is dropped.

If the CG PUSCH has priority index 0, in one alternative, the sequence is generated in the order of HP HARQ-ACK, UTO-UCI and LP HARQ-ACK. Thus, the UTO-UCI is appended to HARQ-ACK with priority index 1 first, and the HARQ-ACK with priority index 0 is appended after the UTO-UCI. In another alternative, only HARQ-ACK with priority index 1 is included. Thus, the sequence is generated in the order of HARQ-ACK with priority index 1 and UTO-UCI. The UTO-UCI is appended to HARQ-ACK with priority index 1, and the HARQ-ACK with priority index 0 is dropped.

The above priority based method assumes the order of UTO-UCI before HARQ-ACK under the same priority. If the order of HARQ-ACK before UTO-UCI is used, the results will be as following.

In one case, if a PUCCH contains only one HARQ-ACK codebook overlaps with the CG PUSCH, and the PUCCH and the CG PUSCH have the same priority, the sequence for joint coding is in the order of HARQ-ACK before UTO-UCI. The UE jointly encodes the HARQ-ACK information and the UTO-UCI and determines a number of resources for multiplexing the combined information in a PUSCH using $\beta_{offset}^{HARQ-ACK}$ which provides indexes $I_{offset,1}^{HARQ-ACK}$ and $I_{offset,2}^{HARQ-ACK}$ for the UE to use if the UE multiplexes up to 11, and more than 11 combined information bits, respectively.

In another case, if a PUCCH with priority index 1 contains both HARQ-ACK with priority 1 and HARQ-ACK with priority 0 overlaps with the CG PUSCH, of if the CG PUSCH overlaps with two PUCCHs with different priorities carrying HARQ-ACK with priority 1 and HARQ-ACK with priority 0 respectively, how to perform joint coding of HARQ-ACK and UTO-UCI should be further determined.

If the CG PUSCH has priority index 1, in one alternative, the sequence is generated in the order of HP HARQ-ACK, UTO-UCI and LP HARQ-ACK. Thus, the UTO-UCI is appended to HARQ-ACK with priority index 1 first, and the HARQ-ACK with priority index 0 is appended after the UTO-UCI. In another alternative, only HARQ-ACK with priority index 1 is included. Thus, the sequence is generated in the order of HARQ-ACK with priority index 1 and UTO-UCI, i.e. the UTO-UCI is appended to HARQ-ACK with priority index 1, and the HARQ-ACK with priority index 0 is dropped.

If the CG PUSCH has priority index 0, in one alternative, the sequence is generated in the order of HP HARQ-ACK, LP HARQ-ACK and UTO-UCI. Thus, the HARQ-ACK with priority index 0 is appended to HARQ-ACK with priority index 1 first, and the UTO-UCI is appended after the HARQ-ACK with priority index 0. In another alternative, only HARQ-ACK with priority index 1 is included. Thus, the sequence is generated in the order of HARQ-ACK with priority index 1 and UTO-UCI. The UTO-UCI is appended to HARQ-ACK with priority index 1, and the HARQ-ACK with priority index 0 is dropped.

For all methods (Method 1/Method 2/Method 3) above, for the beta offset used to determines the number of resources for multiplexing the combined information in a PUSCH, the following approaches can be considered.

In one approach, the $\beta_{offset}^{HARQ-ACK}$ for HARQ-ACK is used for multiplexing of the joint UTO-UCI and HARQ-ACK, assuming that HARQ-ACK has the same priority as the CG PUSCH. The UE jointly encodes the HARQ-ACK information and the UTO-UCI and determines a number of resources for multiplexing the combined information in a PUSCH using $\beta_{offset}^{HARQ-ACK}$ which provides indexes $I_{offset,1}^{HARQ-ACK}$ and $I_{offset,2}^{HARQ-ACK}$ for the UE to use if the UE multiplexes up to 11, and more than 11 combined information bits, respectively.

Additionally or alternatively, depending on the priorities of the CG PUSCH and the HARQ-ACK, the corresponding $\beta_{offset}^{HARQ-ACK}$ for multiplexing HARQ-ACK is determined based on the channel priorities, e.g., $\beta_{offset}^{HARQ-ACK,1}$ or $\beta_{offset}^{HARQ-ACK,0}$. For example, for sequence with HARQ-ACK with priority index 0 only on CG PUSCH with priority index 1, $\beta_{offset}^{HARQ-ACK,0}$ is used. For sequence includes HARQ-ACK with priority index 1 (with or without HARQ-ACK with low priority) on CG PUSCH with priority index 0, the $\beta_{offset}^{HARQ-ACK}$ for the joint coding should be determined by the HARQ-ACK with priority index 1.

HARQ-ACK and Unused Transmission PUSCH Occasion Uplink Control Information (UTO-UCI) Collision Handling for CG with Multiple PUSCH Occasions In case of HARQ-ACK collision with a CG PUSCH with UTO-UCI, if cg-UCI-Multiplexing is not provided, UTO-UCI and HARQ-ACK cannot be jointly encoded. Several alternatives can be considered on the dropping rules or multiplexing methods between UTO-UCI and HARQ-ACK when joint encoding is not configured.

Alternative 1: Allow to drop the UTO-UCI and multiplex the HARQ-ACK on the CG PUSCH For CG-UCI, the CG-UCI and CG PUSCH should be transmitted together or dropped together. A CG PUSCH without a CG-UCI cannot be decoded or acknowledged because the HARQ process ID, RV version and new data indicator are all indicated in the CG-UCI.

However, drop of UTO-UCI will not destroy the PUSCH for the gNB reception. Thus, in one alternative, a special handling can be performed in case of HARQ-ACK to be reported one a CG PUSCH with UTO-UCI. Without joint UCI encoding and multiplexing, the UE may choose to drop the UTO-UCI and report only the HARQ-ACK on the CG PUSCH in some cases.

The special handling may be applied considering the HARQ-ACK priority and the CG PUSCH priority. Whether the HARQ-ACK is multiplexed on the CG PUSCH is further determined by whether UCI multiplexing with different priorities is supported.

Therefore, if cg-UCI-Multiplexing is not provided, considering channel priorities and multiplexing configurations, there are 5 potential cases if there is only one HARQ-ACK codebook in a PUCCH overlaps with the CG PUSCH.

Case 1: If the CG PUSCH with UTO-UCI and the HARQ-ACK on the overlapping PUCCH have the same priority, the HARQ-ACK is multiplexed on the CG PUSCH, and the UTO-UCI is dropped. The UE applies the $\beta_{offset}^{HARQ-ACK}$ for multiplexing HARQ-ACK information on the PUSCH.

Case 2: If the PUCCH with HARQ-ACK has higher priority than the CG PUSCH with UTO-UCI, and if the UE is provided uci-MuxWithDiffPrio and the timeline conditions are satisfied, the high priority HARQ-ACK is multiplexed on the low priority CG PUSCH, and the UTO-UCI is dropped.

Offsets $\beta_{offset}^{HARQ-ACK,1}$ for multiplexing HARQ-ACK information with priority 1 in a PUSCH transmission with priority 0 are configured to values according to Table 9.3-1. The first, second and third values provided by any of BetaOffsetsCrossPri1, betaOffsetsCrossPri1DCI-0-2, or cg-betaOffsetsCrossPri1 respectively provide indexes $I_{offset,0}^{HARQ-ACK,1}$, $I_{offset,1}^{HARQ-ACK,1}$, and $I_{offset,2}^{HARQ-ACK,1}$ for the UE to use if the UE multiplexes up to 2 bits, more than 2 and up to 11 bits, and more than 11 bits of HARQ-ACK information with priority 1 in the PUSCH transmission with priority 0, respectively.

Case 3: If the PUCCH with HARQ-ACK has higher priority than the CG PUSCH with UTO-UCI, and if the UE is not provided uci-MuxWithDiffPrio, the high priority HARQ-ACK is reported on the PUCCH, and the low priority CG PUSCH with the UTO-UCI is dropped.

Case 4: If the PUCCH with HARQ-ACK has lower priority than the CG PUSCH with UTO-UCI, and if the UE is provided uci-MuxWithDiffPrio and the timeline conditions are satisfied, the low priority HARQ-ACK is multiplexed on the high priority CG PUSCH and the UTO-UCI is dropped.

Offsets $\beta_{offset}^{HARQ-ACK,0}$ for multiplexing HARQ-ACK information with priority 0 in a PUSCH transmission with priority 1 are configured to values according to Table 9.3-1. The first, second and third values provided by any of BetaOffsetsCrossPri0, betaOffsetsCrossPri0DCI-0-2, or cg-betaOffsetsCrossPri0 respectively provide indexes $I_{offset,0}^{HARQ-ACK,0}$, $I_{offset,1}^{HARQ-ACK,0}$, $I_{offset,2}^{HARQ-ACK,0}$ for the UE to use if the UE multiplexes up to 2 bits, more than 2 and up to 11 bits, and more than 11 bits of HARQ-ACK information with priority 0 in the PUSCH transmission with priority 1, respectively.

Case 5: If the PUCCH with HARQ-ACK has lower priority than the CG PUSCH with UTO-UCI, and if the UE is not provided uci-MuxWithDiffPrio, the low priority HARQ-ACK PUCCH is not transmitted, and the high priority CG PUSCH with UTO-UCI is transmitted.

Alternatively in Case 5, the UE can report HARQ-ACK and drop the UTO-UCI assuming the HARQ-ACK has the same priority, and the UE applies the corresponding $\beta_{offset}^{HARQ-ACK}$ for multiplexing HARQ-ACK information on the PUSCH.

In another approach, since UTO-UCI can be updated in later CG PUSCH transmissions, the same behavior in Case 1 can be extended to all cases above as a unified solution. That is, regardless of the priority between the HARQ-ACK and the CG PUSCH, the UTO-UCI is always dropped, and HARQ-ACK is multiplexed on the CG PUSCH using the appropriate HARQ-ACK beta offset.

If the HARQ-ACK includes both HARQ-ACK with priority index 1 and HARQ-ACK with priority index 0, i.e. if a PUCCH with priority index 1 contains both HARQ-ACK with priority 1 and HARQ-ACK with priority 0 overlaps with the CG PUSCH, of if the CG PUSCH overlaps with two non-overlapping PUCCHs with different priorities carrying HARQ-ACK with priority 1 and HARQ-ACK with priority 0 respectively, the UE is provided uci-MuxWithDiffPrio, several options can be considered. In one option (Option 1), only HARQ-ACK with priority index 1 is multiplexed on the CG PUSCH; the UTO-UCI and HARQ-ACK with priority index 0 are dropped. This may be applied to any HARQ-ACK payload sizes. In a special case, if the total number of HARQ-ACK bits is two bits with different priorities, i.e. 1 bit of HARQ-ACK with priority 1 and 1 bit of HARQ-ACK bit with priority 0, the two HARQ-ACK bits are jointly coded on a PUCCH format 0/1 assuming they are all priority index 1. Thus, for multiplexing with UTO-UCI, the two HARQ-ACK bits can be treated as one HARQ-ACK codebook with priority index 1.

In another option (Option 2), both HARQ-ACK with priority index 1 and HARQ-ACK with priority index 0 are multiplexed on the CG PUSCH; the UTO-UCI is dropped. Note that for multiplexing of HARQ-ACK with different priorities on PUSCH, separate coding is applied to different HARQ-ACK codebooks with different beta offset values.

Yet in another option (Option 3), whether LP HARQ-ACK is included depends on the CG PUSCH priority. Thus, If the CG PUSCH has priority index 1, only HARQ-ACK with priority index 1 is multiplexed on the CG PUSCH, UTO-UCI and HARQ-ACK with priority index 0 are dropped, i.e. Option 1. If the CG PUSCH has priority index 0, both HARQ-ACK with priority index 1 and HARQ-ACK with priority 1 are multiplexed on the CG PUSCH, UTO-UCI is dropped, i.e. Option 2.

Additionally, depending on the priorities of the CG PUSCH and the HARQ-ACK, the corresponding $\beta_{offset}^{HARQ-ACK}$ for multiplexing HARQ-ACK is determined based on the channel priorities, e.g., $\beta_{offset}^{HARQ-ACK,1}$ or $\beta_{offset}^{HARQ-ACK,0}$. For example, for sequence with HARQ-ACK with priority index 0 only on CG PUSCH with priority index 1, $\beta_{offset}^{HARQ-ACK,0}$ is used. For sequence includes HARQ-ACK with priority index 1 (with or without HARQ-ACK with low priority) on CG PUSCH with priority index 0, $\beta_{offset}^{HARQ-ACK,1}$ is used.

Alternative 3: perform separate coding for the HARQ-ACK and UTO-UCI if they have different priorities.

Defined first in NR-U, the cg-UCI-Multiplexing parameter is for joint multiplexing for HARQ-ACK and CG-UCI assuming the same priority. In another alternative, if cg-UCI-Multiplexing is not provided, joint coding cannot be applied for HARQ-ACK and UTO-UCI, but separate coding may be considered as long as the maximum number of coding chains on the PUSCH is not exceeded.

Therefore, if the HARQ-ACK on overlapping PUCCH has the same priority as the CG PUSCH, the dropping behavior can be applied as in Alternative 1 or Alternative 2 above.

Option 1: Since joint coding of HARQ-ACK and UTO-UCI cannot be applied, only one UCI may be reported. For example, the HARQ-ACK is multiplexing on the CG PUSCH and the UTO-UCI is dropped.

Alternatively, if cg-UCI-Multiplexing is not provided, separate coding is applied for HARQ-ACK and UTO-UCI with a defined multiplexing order as shown in the options below.

In one option (Option 2), the UTO-UCI is multiplexed on the CG PUSCH first using $\beta_{offset}^{UTO-UCI}$ and the HARQ-ACK is multiplexed after UTO-UCI using a separate coding chain and $\beta_{offset}^{HARQ-ACK}$. Thus, a total of 2 coding chains in the order of UTO-UCI and HARQ-ACK.

In another option (Option 3), the HARQ-ACK is multiplexed on the CG PUSCH first using $\beta_{offset}^{HARQ-ACK}$ and the UTO-UCI is multiplexed after HARQ-ACK using a separate coding chain and $\beta_{offset}^{UTO-UCI}$. Thus, a total of 2 coding chains in the order of HARQ-ACK and UTO-UCI.

If the HARQ-ACK and UTO-UCI have different priorities, separate coding may be used, and the UCI multiplexing order is determined based on the priority of each UCI type. Thus, there are two cases.

If the HARQ-ACK has higher priority than the CG PUSCH with UTO-UCI, and if the UE is provided uci-MuxWithDiffPrio and the timeline conditions are satisfied, the high priority HARQ-ACK is multiplexed on the low priority CG PUSCH first using $\beta_{offset}^{HARQ-ACK,1}$ and the UTO-UCI is multiplexed after HARQ-ACK using a separate coding chain and $\beta_{offset}^{UTO-UCI}$. Thus, a total of 2 coding chains in the order of HP HARQ-ACK and UTO-UCI.

If the HARQ-ACK has lower priority than the CG PUSCH with UTO-UCI, and if the UE is provided uci-MuxWithDiffPrio and the timeline conditions are satisfied, the UTO-UCI is multiplexed first using $\beta_{offset}^{UTO-UCI}$. And the low priority HARQ-ACK is multiplexed after UTO-UCI on the high priority CG PUSCH using a separate coding chain and $\beta_{offset}^{HARQ-ACK,0}$. Thus, a total of 2 coding chains in the order of UTO-UCI and LP HARQ-ACK.

If the HARQ-ACK includes both HARQ-ACK with priority index 1 and HARQ-ACK with priority index 0, i.e. if a PUCCH with priority index 1 contains both HARQ-ACK with priority 1 and HARQ-ACK with priority 0 overlaps with the CG PUSCH, of if the CG PUSCH overlaps with two non-overlapping PUCCHs with different priorities carrying HARQ-ACK with priority 1 and HARQ-ACK with priority 0 respectively, there are two cases:

If CG PUSCH has priority index 1, UTO-UCI also has priority index 1
  In one option (Option 1), only HARQ-ACK with priority index 1 is multiplexed on the CG PUSCH using $\beta_{offset}^{HARQ-ACK}$, UTO-UCI and HARQ-ACK with priority index 0 are dropped. Thus, only one coding chain for HP HARQ-ACK.
  In another option (Option 2): HARQ-ACK with priority index 1 is multiplexed on the CG PUSCH using $\beta_{offset}^{HARQ-ACK}$; HARQ-ACK with priority index 0 is multiplexed with a separate coding chain using $\beta_{offset}^{HARQ-ACK,0}$ after HARQ-ACK with priority index 1 on the CG PUSCH; UTO-UCI is dropped since joint coding with HARQ-ACK is not allowed. Thus, a total of 2 coding chains in the order of HP HARQ-ACK and LP HARQ-ACK.
  Yet in another option (Option 3): HARQ-ACK with priority index 1 is multiplexed on the CG PUSCH using $\beta_{offset}^{HARQ-ACK}$; UTO-UCI is multiplexed with a separate coding chain with $\beta_{offset}^{UTO-UCI}$ after HARQ-ACK with priority index 1 on the CG PUSCH; HARQ-ACK with priority index 0 is dropped. Thus, a total of 2 coding chains in the order of HP HARQ-ACK and UTO-UCI. As a variation of Option 3, the UTO-UCI can be multiplexed first, followed by the HP HARQ-ACK.
  Yet in another option (Option 4): HARQ-ACK with priority index 1 is multiplexed on the CG PUSCH using $\beta_{offset}^{HARQ-ACK}$; UTO-UCI is multiplexed with a separate coding chain with $\beta_{offset}^{HARQ-ACK}$ after HARQ-ACK with priority index 1 on the CG PUSCH; HARQ-ACK with priority index 0 is multiplexed with a separate coding chain using $\beta_{offset}^{HARQ-ACK,0}$ after UTO-UCI on the CG PUSCH. Thus, a total of 3 coding chains in the order of HP HARQ-ACK, UTO-UCI and LP HARQ-ACK. As a variation of Option 4, the UTO-UCI can be multiplexed first, followed by the HP HARQ-ACK and the LP HARQ-ACK.
  Yet in another option (Option 5): HARQ-ACK with priority index 1 is multiplexed on the CG PUSCH using $\beta_{offset}^{HARQ-ACK}$; HARQ-ACK with priority index 0 is multiplexed with a separate coding chain using $\beta_{offset}^{HARQ-ACK}$ after HARQ-ACK with priority index 1 on the CG PUSCH; UTO-UCI is multiplexed with a separate coding chain with $\beta_{offset}^{UTO-UCI}$ after HARQ-ACK with priority index 0 on the CG PUSCH. Thus, a total of 3 coding chains in the order of HP HARQ-ACK, LP HARQ-ACK and UTO-UCI.

If CG PUSCH has priority index 0, UTO-UCI also has priority index 0.
  In one option (Option 1), only HARQ-ACK with priority index 1 is multiplexed on the CG PUSCH using $\beta_{offset}^{HARQ-ACK,1}$, UTO-UCI and HARQ-ACK with priority index 0 are dropped. Thus, only one coding chain for HP HARQ-ACK.
  In another option (Option 2), HARQ-ACK with priority index 1 is multiplexed on the CG PUSCH using $\beta_{offset}^{HARQ-ACK,1}$; HARQ-ACK with priority index 0 is multiplexed with a separate coding chain using $\beta_{offset}^{HARQ-ACK}$ after HARQ-ACK with priority index 1 on the CG PUSCH; UTO-UCI is dropped since joint coding with HARQ-ACK is not allowed. Thus, a total of 2 coding chains in the order of HP HARQ-ACK and LP HARQ-ACK.
  Yet in another option (Option 3), HARQ-ACK with priority index 1 is multiplexed on the CG PUSCH using $\beta_{offset}^{HARQ-ACK,1}$; UTO-UCI is multiplexed with a separate coding chain with $\beta_{offset}^{UTO-UCI}$ after HARQ-ACK with priority index 1 on the CG PUSCH; HARQ-ACK with priority index 0 is dropped. Thus, a total of 2 coding chains in the order of HP HARQ-ACK and UTO-UCI.
  Yet in another option (Option 4): HARQ-ACK with priority index 1 is multiplexed on the CG PUSCH using $\beta_{offset}^{HARQ-ACK,1}$; UTO-UCI is multiplexed with a separate coding chain with $\beta_{offset}^{UTO-UCI}$ after HARQ-ACK with priority index 1 on the CG PUSCH; HARQ-ACK with priority index 0 is multiplexed with a separate coding chain using $\beta_{offset}^{HARQ-ACK}$ after UTO-UCI on the CG PUSCH. Thus, a total of 3 coding chains in the order of HP HARQ-ACK, UTO-UCI and LP HARQ-ACK.
  Yet in another option (Option 5): HARQ-ACK with priority index 1 is multiplexed on the CG PUSCH using $\beta_{offset}^{HARQ-ACK,1}$; HARQ-ACK with priority index 0 is multiplexed with a separate coding chain using $\beta_{offset}^{HARQ-ACK}$ after HARQ-ACK with priority index 1 on the CG PUSCH; UTO-UCI is multiplexed with a separate coding chain with $\beta_{offset}^{UTO-UCI}$ after HARQ-ACK with priority index 0 on the CG PUSCH. Thus, a total of 3 coding chains in the order of HP HARQ-ACK, LP HARQ-ACK and UTO-UCI.

Unused Transmission PUSCH Occasion Uplink Control Information (UTO-UCI) for CG with Multiple PUSCH Occasions For dynamic indication of unused CG PUSCH transmission occasion(s) based on a UCI, the indicated "unused" CG PUSCH TO(s), if any, by the UCI in a CG PUSCH for a CG configuration. The unused CG PUSCH TO(s) can be consecutive or non-consecutive CG PUSCH TO(s) in time domain. FFS whether/how the unused TO(s) can be associated to multiple CG configuration.

If supported, different multi-PUSCH CGs may be configured may be configured for different XR applications. The multi-PUSCH CGs may have very different configurations in time domain resource allocation (TDRA), frequency domain resource allocation (FDRA), and periodicity, etc. Also, there may be overlapping in time or frequency domain resources between different multi-PUSCH CGs. If the UTO-UCI is associated with multiple CGs, the UTO-UCI payload and UCI overhead will be increased for all configured multi-PUSCH CGs. Thus, it is better to control each multi-PUSCH CG separately by its own UTO-UCI.

The UTO-UCI provides a bitmap where a bit corresponds to a TO within a time duration/range. The bit indicates whether the TO is "unused". Several methods can be considered for the details including time duration/range.

Aspect 1: What Bit is Used to Indicate Unused PUSCH TO(s) and Other TO(s).

The value to indicate an unused PUSCH TO in the bit map should be defined first.

In one approach, a bit of "0" indicates that the corresponding PUSCH TO is "unused", and a bit of "1" indicates that the corresponding PUSCH TO is "not unused".

In another approach, a bit of "1" indicates that the corresponding PUSCH TO is "unused", and a bit of "0" indicates that the corresponding PUSCH TO is "not unused".

The UE is not expected to transit in a PUSCH TO that is indicated as "unused", and the UE may or may not transmit a PUSCH in a PUSCH TO that is indicated as "not unused". That is, if there is not buffered data for the configured multi-PUSCH CG in an PUSCH TO indicated as "not unused", the UE may skip and not transmit in the PUSCH TO.

Aspect 2: What's the Start Point of the PUSCH TO in the UTO-UCI Indication

The UTO-UCI is used to indicate the "unused" PUSCH TOs for future transmissions based on current and/or predicted traffic load. Thus, it should not indicate any PUSCH TOs in the past. Several methods can be considered as the starting PUSCH TO for the UTO-UCI.

Method 1: Start from Current PUSCH Transmission Inclusive.

In one method, the UTO-UCI includes the current PUSCH transmission carrying the UTO-UCI.

Since UTO-UCI is included in every transmitted PUSCH, the presence of UTO-UCI is also a confirmation of the PUSCH transmission. If the UTO-UCI bit starts from the current PUSCH transmission, the first bit in the bitmap must be indicated as "not unused" to confirm the PUSCH transmission. On the other hand, since the first bit is always deterministic as "not unused", it is an overhead without carrying additional information.

Since the same FDRA and MCS is used in every PUSCH transmission, the gNB knows the payload of the UTO-UCI and the beta offset, thus the resource elements for the multiplexed UTO-UCI on a PUSCH. From the gNB reception and decoding perspective, the UTO-UCI is more reliable since UCI has much lower FER requirements than a PUSCH. In case of a PUSCH cannot be decoded correctly at the gNB, the gNB may not be able to differentiate it from a DTX, i,e, no PUSCH transmission. The correct reception of the UTO-UCI can be a confirmation that the PUSCH is actually transmitted. The first bit of the UTO-UCI indicated as "not unused" performs a double confirmation.

Method 2: Start from Next CG PUSCH TO or Immediately after the Current CG PUSCH Transmission In another method, only the future PUSCH TOs are indicated. Thus, the UTO-UCI does not include the current PUSCH transmission carrying the UTO-UCI, and the UTO-UCI bit starts from the next PUSCH TO of the multi-PUSCH CG configuration. The starting point may be immediately after the current CG PUSCH transmission.

In this case, the correct reception of the UTO-UCI can be a confirmation that the PUSCH is actually transmitted when the PUSCH cannot be decoded correctly at the gNB.

Method 3: Start from the PUSCH TOs with a Processing Delay after the Current Transmission Yet in another method, processing time can be considered, and the gNB may not be able to apply the received UTO-UCI immediately after the current PUSCH reception and UTO-UCI detection.

In one alternative, a processing time N may be specified, and the UTO-UCI bit starts from a PUSCH TO that is N symbols after the current PUSCH transmission. The processing time parameter N may be fixed and specified in the specifications. The processing time parameter N may be configurable and provided by a higher layer signaling. The processing time N may be associated or be a part of the UE capabilities.

In another alternative, a number of PUSCH TOs k may be specified as an UTO-UCI delay parameter, and the UTO-UCI bit starts from a PUSCH TO that is k PUSCH TOs after the current PUSCH transmission. The delay parameter k may be fixed and specified in the specifications, e.g. 2 TOs. The delay parameter k may be configurable and provided by a higher layer signaling. The delay parameter k may be associated or a part of the UE capabilities.

Aspect 3: What's the Duration of the UTO-UCI Indication

The time duration for the UTO-UCI indication determines the UCI payload, i.e. the number of bits in a UTO-UCI. The longer the duration, the more bits are required, and the gNB can have more information on the incoming traffic. On the other hand, the longer time information may not be accurate and requires more changes in the UTO-UCI of later PUSCH transmissions. Therefore, there is a tradeoff between the time duration and the indication validity/accuracy, esp. for the PUSCH TO with a longer gap from the indication.

Approach 1: Use the Periodicity as the Duration

A simple and straightforward method is to apply the periodicity as the duration. In this case, the UTO-UCI provides a sliding window of a whole periodicity from the starting position. If a single bit is used for each PUSCH TO in a period, This method has a fixed payload size with the number of bits equals to the number of PUSCH TOs in a period.

Approach 2: The Duration is Defined as a Time Range or a Number of PUSCH TOs.

In another approach, the duration can be defined as a time range or a number of PUSCH TOs.

In one case, the duration may be defined as a time range from the starting point, e.g. 10 ms, 20 slots, etc. In this case, the number of PUSCH TOs in the given duration and the UTI-UCI payload, may be variable based on the actual TDRA configuration and the starting point of the duration.

In another case, the duration may be defined as a number of PUSCH TOs from the starting point. In this case, the UTO-UCI payload is fixed, but the actual time duration of the indication may be variable based on the actual TDRA configuration and the starting point of the duration.

If the duration is short, e.g. shorter than the periodicity, the UTO-UCI provides more timely indication on the future PUSCH TOs. This is more useful when the traffic load is high, and more dynamic indication is needed. The UCI overhead is lower because the UTO-UCI payload is smaller in this case.

On the other hand, if the duration is long, e.g. longer than the periodicity, the UTO-UCI provides more prediction on the future PUSCH TOs. This is more useful when the traffic load is low, and less dynamic indication is needed. The UCI overhead is higher because the UTO-UCI payload is larger in this case.

To support different durations for different conditions, the duration may be configured by higher layer signaling. A more dynamic duration update may be supported by a MAC CE or a DCI to indicate an index from a list of supported durations, either in time durations or numbers of PUSCH TOs.

Aspect 4: The Validity Timeline and Whether the "Unused" Indication can be Overridden in a Later UTO-UCI The UTO-UCI is included in every transmitted PUSCH, and the content of the UTO-UCI should be updated based on actual traffic load observed and predicted at the current PUSCH transmission timing. Thus, an "unused" PUSCH TO indication can be overridden if the traffic load is changed. However, due to UCI processing time and the UE and the gNB, some restrictions should be applied for overriding an "unused" PUSCH TO.

With the observation of tradeoff between the duration and indication validity, the indication is less accurate and tends to change for PUSCH TOs that has longer distance from the UTO-UCI. Thus, an additional range value may be configured within the duration, where the duration can be determined by Approach 1 or Approach 2 above.

The range value should be defined in the same manner as the duration, i.e, it can be as a time range or a number of PUSCH TOs from the starting point. The range value should be smaller than the duration value. The range may be a fixed value specified in the standard. The range may be configured by higher layer signaling. The range may be indicated or updated dynamically together with the duration. The range value may be determined based on UE capabilities.

The range is defined from the beginning of the UTO-UCI, i.e. from the earliest PUSCH TO indication. With the addition range parameter, the "unused" indications within the range from the starting point should be more deterministic, and should be valid until expires and should not be changed in a later UTO-UCI. Comparatively, the "unused" indications after the range and within indication duration can be more informative as a rough estimation. And the "unused" PUSCH TOs in this region can be modified and updated in a later UTO-UCI. Effectively, this provides a guaranteed "unused" PUSCH TOs within the smaller range with a best effort estimation in a long term of the duration.

The range also determines the validation timeline of a "unused" TO indication. With a range sliding window in every UTO-UCI report, the an unused indication is valid at least for the range period when it is first indication as the nearest PUSCH TO.

For example, assume a multi-PUSCH CG is configured with a periodicity of 20 ms and 8 PUSCH TOs in a period. Suppose the periodicity is used as the time duration and a range of 4 PUSCH TOs are used for UTO-UCI indication. Thus, the UTO-UCI can be 8 bits, each bit indicates whether the PUSCH TO is "unused" or "not unused". The first 4 bits are within the range, and the "unused" PUSCH TOs in the first 4 bits are more reliable and should not be modified in the UTO-UCI of a later PUSCH transmission. But the "unused" PUSCH TOs in the last 4 bits can be modified in the UTO-UCI of a later PUSCH transmission.

In a PUSCH TO indicated as "not unused", the UE may transmit a CG PUSCH if there is data for the configure CG, and the UE may skip the PUSCH TO if there is no data for the configured CG. Thus, it is more flexible than a PUSCH TO marked as "unused". In one approach, all indications within the range cannot be modified in later UTO-UCI, even for PUSCH TO indicated as "not unused". In another approach, a PUSCH TO indicated as "not unused" may be updated as "unused" within the range. But a PUSCH TO indicated as "unused" cannot be modified to "not unused" to maintain the validity of "unused" indication. Outside the range in the duration, all PUSCH TO indication can be updated or modified regardless the previous status.

With two parameters of range and duration, additional optimization may be applied for UTO-UCI payload reduction. For example, a one-to-one mapping bitmap for PUSCH TOs is applied only within the range with deterministic "unused" indication, the remaining PUSCH TOs in the duration after the range can be reported without detailed one-to-one mapping. For example, it can be reported as a channel occupancy ratio from a list of predefined or configured value. Alternatively, it can indicate a total number of "unused" PUSCH TOs without giving the exact mapping to each PUSCH TO. Since the UTO-UCI provides indication of PUSCH TOs in a sliding window, the actual usage of the later PUSCH TOs can be updated when it moves closer into the more reliable range for indication.

Using the same example above, the UTO-UCI can be compressed to 6 bits from 8 bits. The first 4 bits indicates the usage of the first 4 PUSCH TOs within the range. Instead of using 4 bits to indicate each PUSCH TO in the duration after the range, 2 bits can be used to indicate the channel occupancy ratio in the next 4 PUSCH TOs, e.g. 00 for 0-25% "unused", 01 for 25-50% "unused", 10 for all 50-75% "unused", 11 for 75-100% "unused".

Figure 8:
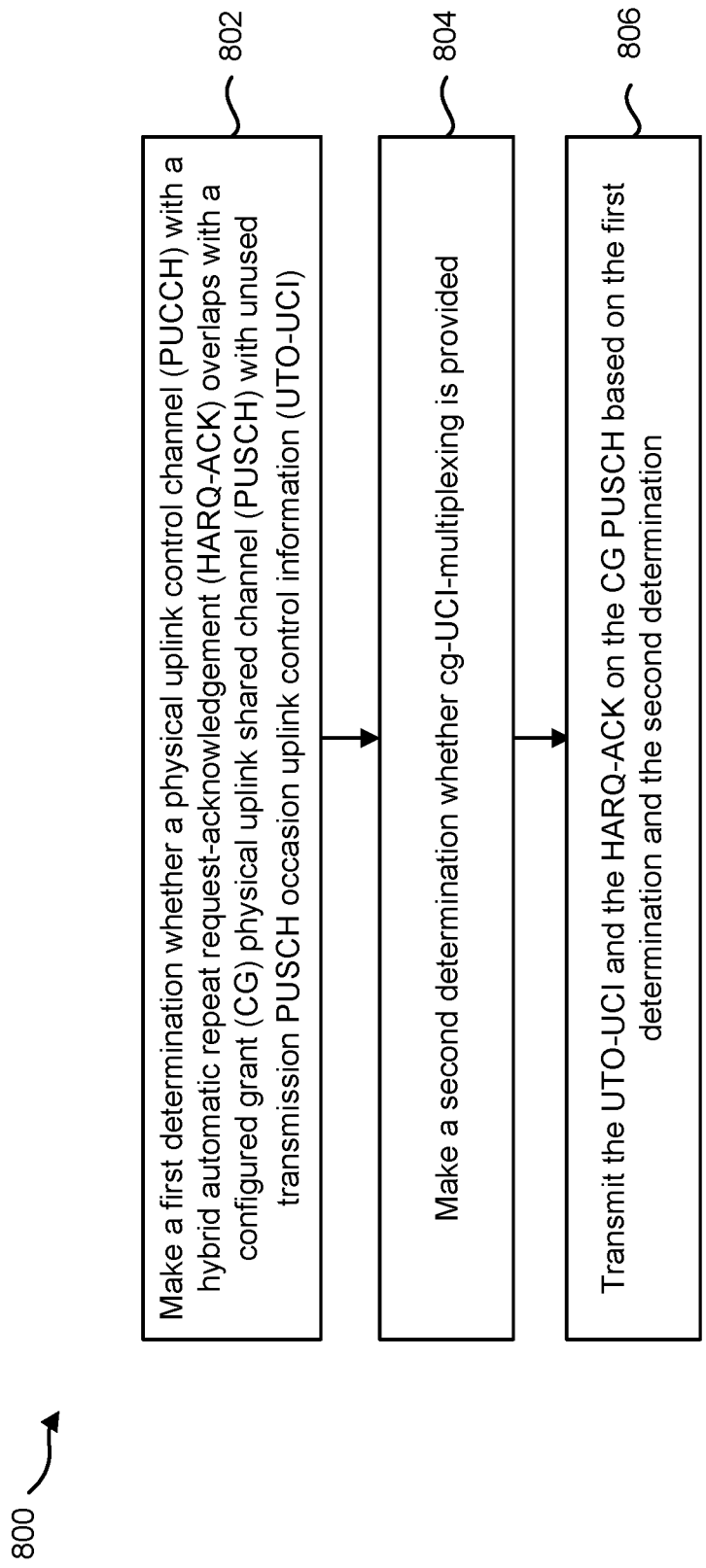
FIG. 8 is a flow diagram illustrating a method by a UE for joint HARQ-ACK and unused transmission PUSCH occasion uplink control information (UTO-UCI) reporting for CG with multiple PUSCH occasions.

FIG. 8 is a flow diagram illustrating a method 800 by a UE 102 for joint HARQ-ACK and unused transmission PUSCH occasion uplink control information (UTO-UCI) reporting for CG with multiple PUSCH occasions. The UE 102 may make 802 a first determination whether a physical uplink control channel (PUCCH) with a hybrid automatic repeat request-acknowledgement (HARQ-ACK) overlaps with a configured grant (CG) physical uplink shared channel (PUSCH) with unused transmission PUSCH occasion uplink control information (UTO-UCI). The UE may make 804 a second determination whether cg-UCI-multiplexing is provided. The UE may transmit 806 the UTO-UCI and/or the HARQ-ACK on the CG PUSCH based on the first determination and the second determination.

Figure 9:
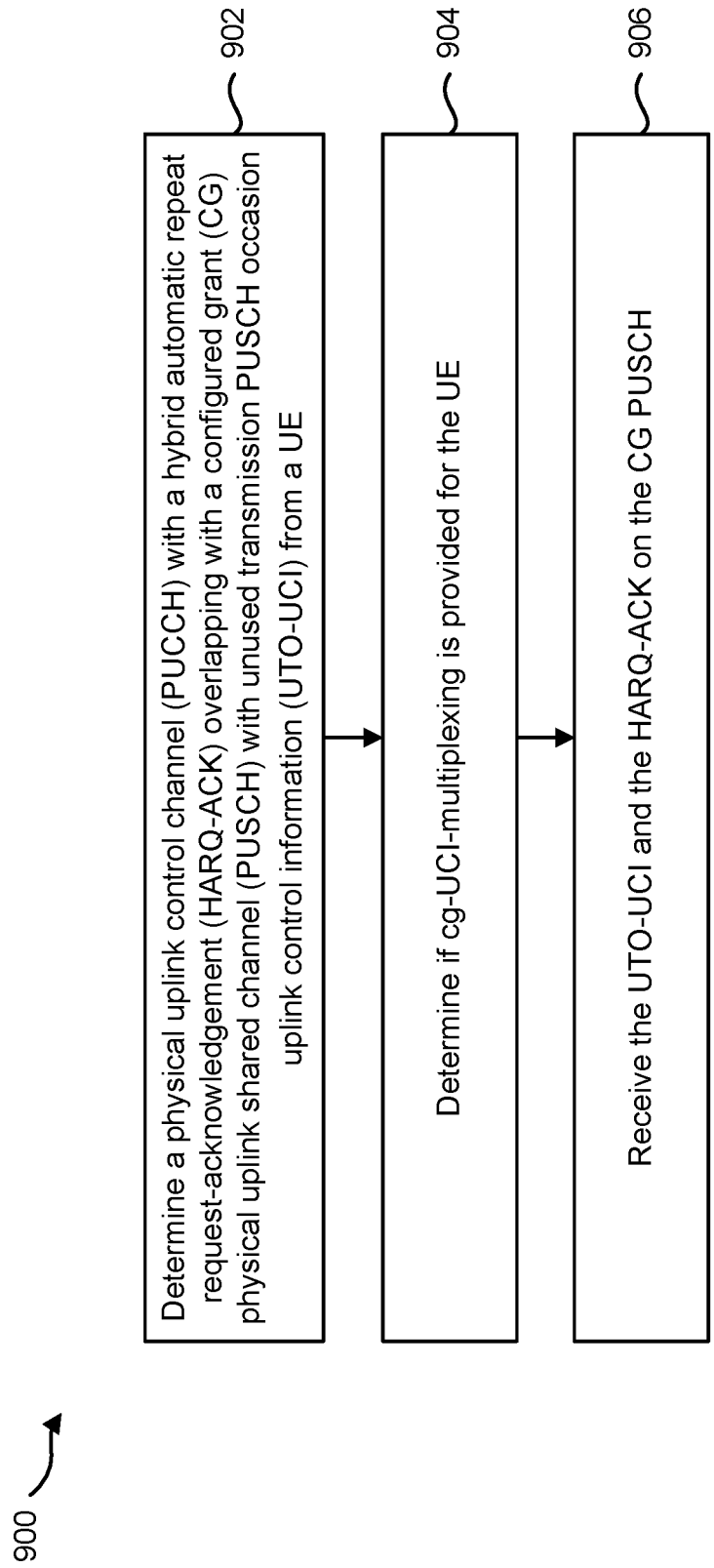
FIG. 9 is a flow diagram illustrating a method by a gNB for joint HARQ-ACK and unused transmission PUSCH occasion uplink control information (UTO-UCI) reporting for CG with multiple PUSCH occasions.

FIG. 9 is a flow diagram illustrating a method 900 by a gNB 160 for joint HARQ-ACK and unused transmission PUSCH occasion uplink control information (UTO-UCI) reporting for CG with multiple PUSCH occasions. The gNB may determine 902 a physical uplink control channel (PUCCH) with a hybrid automatic repeat request-acknowledgement (HARQ-ACK) overlapping with a configured grant (CG) physical uplink shared channel (PUSCH) with unused transmission PUSCH occasion uplink control information (UTO-UCI) from a UE. The gNB may determine 904 if cg-UCI-multiplexing is provided for the UE. The gNB may receive 906 the UTO-UCI and the HARQ-ACK on the CG PUSCH.

Figure 10:
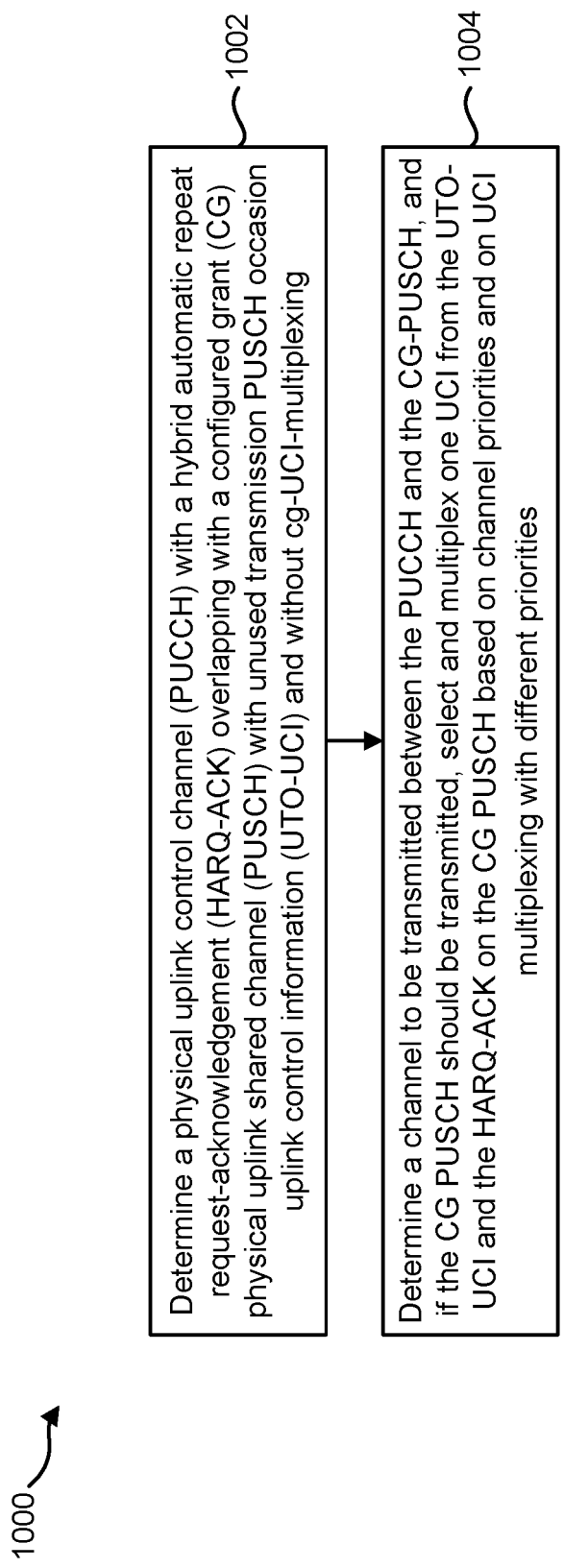
FIG. 10 is a flow diagram illustrating a method by a UE for HARQ-ACK and unused transmission PUSCH occasion uplink control information (UTO-UCI) collision handling for CG with multiple PUSCH occasions.

FIG. 10 is a flow diagram illustrating a method 1000 by a UE 102 for HARQ-ACK and unused transmission PUSCH occasion uplink control information (UTO-UCI) collision handling for CG with multiple PUSCH occasions. The UE may determine 1002 a physical uplink control channel (PUCCH) with a hybrid automatic repeat request-acknowledgement (HARQ-ACK) overlapping with a configured grant (CG) physical uplink shared channel (PUSCH) with unused transmission PUSCH occasion uplink control information (UTO-UCI) and without cg-UCI-multiplexing. The UE may determine which channel is transmitted, and if the UE determines that the CG PUSCH is transmitted, the UE may select 1004 and multiplex one UCI from the UTO-UCI and the HARQ-ACK on the CG PUSCH based on channel priorities and on UCI multiplexing with different priorities.

Figure 11:
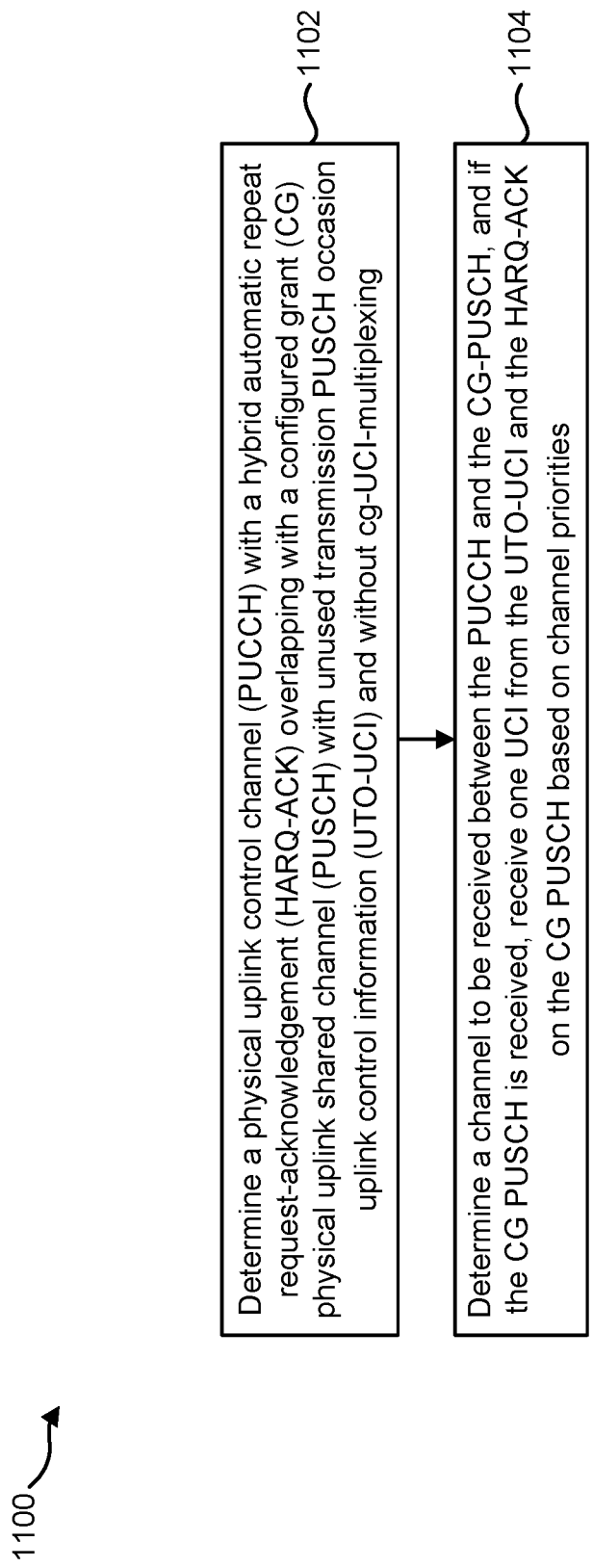
FIG. 11 is a flow diagram illustrating a method by a gNB for HARQ-ACK and unused transmission PUSCH occasion uplink control information (UTO-UCI) collision handling for CG with multiple PUSCH occasions.

FIG. 11 is a flow diagram illustrating a method 1100 by a gNB 160 for HARQ-ACK and unused transmission PUSCH occasion uplink control information (UTO-UCI) collision handling for CG with multiple PUSCH occasions. The gNB may determine 1102 a physical uplink control channel (PUCCH) with a hybrid automatic repeat request-acknowledgement (HARQ-ACK) overlapping with a configured grant (CG) physical uplink shared channel (PUSCH) with unused transmission PUSCH occasion uplink control information (UTO-UCI) and without cg-UCI-multiplexing. The gNB may determine a channel to be received between the PUCCH and the CG-PUSCH, and if the CG PUSCH is received, receive 1104 one UCI from the UTO-UCI and the HARQ-ACK on the CG PUSCH based on channel priorities.

Figure 12:
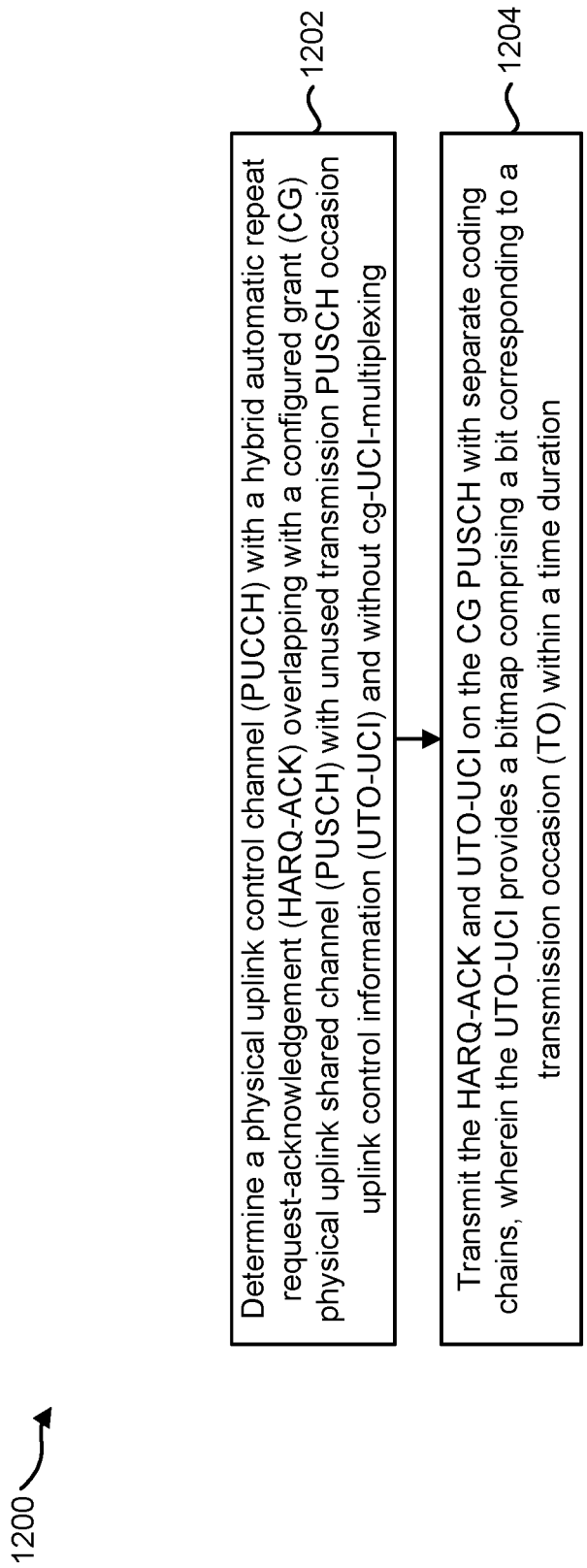
FIG. 12 is a flow diagram illustrating a method by a UE for unused transmission PUSCH occasion uplink control information (UTO-UCI) for CG with multiple PUSCH occasions.

FIG. 12 is a flow diagram illustrating a method 1200 by a UE 102 for unused transmission PUSCH occasion uplink control information (UTO-UCI) for CG with multiple PUSCH occasions. The UE may determine 1202 a physical uplink control channel (PUCCH) with a hybrid automatic repeat request-acknowledgement (HARQ-ACK) overlapping with a configured grant (CG) physical uplink shared channel (PUSCH) with unused transmission PUSCH occasion uplink control information (UTO-UCI) and without cg-UCI-multiplexing. The UE may transmit 1204 the HARQ-ACK and UTO-UCI on the CG PUSCH with separate coding chains, wherein the UTO-UCI provides a bitmap comprising a bit corresponding to a transmission occasion (TO) within a time duration.

Figure 13:
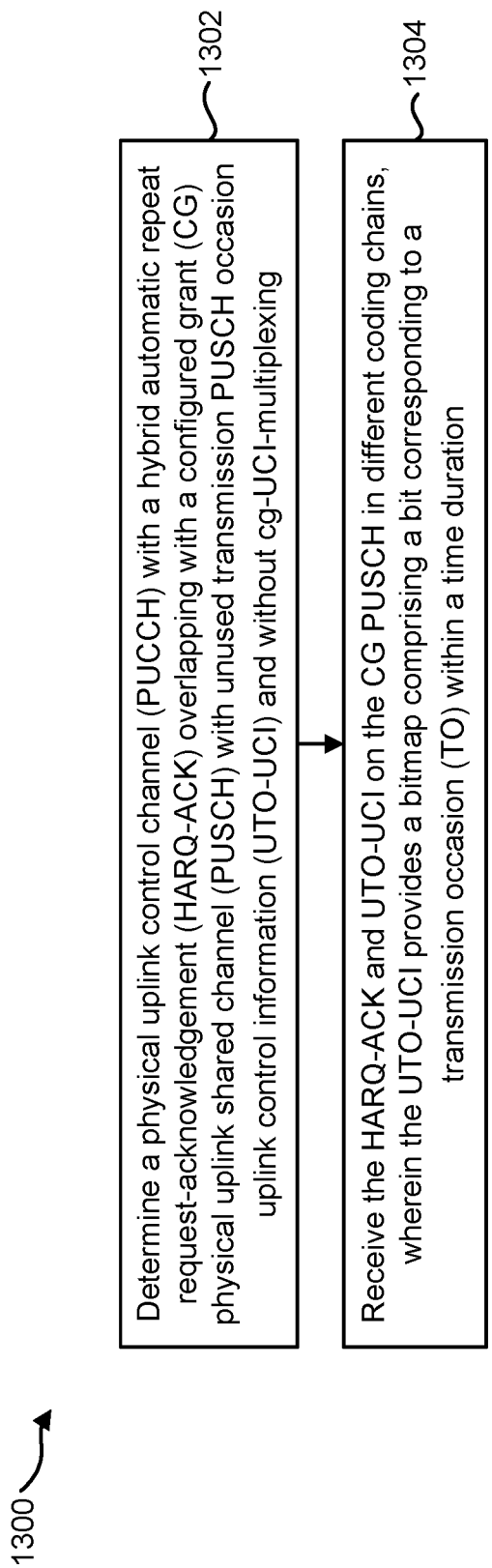
FIG. 13 is a flow diagram illustrating a method by a gNB for unused transmission PUSCH occasion uplink control information (UTO-UCI) for CG with multiple PUSCH occasions.

FIG. 13 is a flow diagram illustrating a method 1300 by a gNB 160 for unused transmission PUSCH occasion uplink control information (UTO-UCI) for CG with multiple PUSCH occasions. The gNB may determine 1302 a physical uplink control channel (PUCCH) with a hybrid automatic repeat request-acknowledgement (HARQ-ACK) overlapping with a configured grant (CG) physical uplink shared channel (PUSCH) with unused transmission PUSCH occasion uplink control information (UTO-UCI) and without cg-UCI-multiplexing. The gNB may receive 1304 the HARQ-ACK and UTO-UCI on the CG PUSCH in different coding chains, wherein the UTO-UCI provides a bitmap comprising a bit corresponding to a transmission occasion (TO) within a time duration.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE), comprising:
receiving circuitry configured to receive a configuration for a configured grant (CG) with multiple physical uplink shared channel (PUSCH) transmission occasions (TOs) in a period, with unused transmission PUSCH occasion uplink control information (UTO-UCI) to be included in a CG PUSCH; and
transmitting circuitry configured to transmit the UTO-UCI on a CG PUSCH, wherein the UTO-UCI provides a bitmap comprising a number of bits, wherein each bit in the bitmap corresponds to a CG PUSCH TO start from the next CG PUSCH TO, with the number of bits configured by higher layer signaling.

2. A base station (gNB), comprising:
transmitting circuitry configured to configure a configured grant (CG) with multiple physical uplink shared channel (PUSCH) transmission occasions (TOs) in a period, with unused transmission PUSCH occasion uplink control information (UTO-UCI) to be included in a CG PUSCH; and
receiving circuitry configured to receive the UTO-UCI on a CG PUSCH, wherein the UTO-UCI provides a bitmap comprising a number of bits, wherein each bit in the bitmap corresponds to a CG PUSCH TO start from the next CG PUSCH TO, with the number of bits configured by higher layer signaling.

3. A method by a user equipment (UE), comprising:
receiving a configuration for a configured grant (CG) with multiple physical uplink shared channel (PUSCH) transmission occasions (TOs) in a period, with unused transmission PUSCH occasion uplink control information (UTO-UCI) to be included in a CG PUSCH; and
transmitting the UTO-UCI on a CG PUSCH, wherein the UTO-UCI provides a bitmap comprising a number of bits, wherein each bit in the bitmap corresponds to a CG PUSCH TO start from the next CG PUSCH TO, with the number of bits configured by higher layer signaling.

* * * * *